(12) United States Patent
Singh

(10) Patent No.: US 8,625,732 B2
(45) Date of Patent: Jan. 7, 2014

(54) SYSTEMS AND METHODS FOR STORING SPENT NUCLEAR FUEL

(75) Inventor: Krishna P. Singh, Palm Harbor, FL (US)

(73) Assignee: Holtec International, Inc.

( * ) Notice: Subject to any disclaimer, the term of this patent is extended or adjusted under 35 U.S.C. 154(b) by 0 days.

(21) Appl. No.: 13/323,743

(22) Filed: Dec. 12, 2011

(65) Prior Publication Data

US 2012/0083644 A1 Apr. 5, 2012

Related U.S. Application Data

(63) Continuation of application No. 11/054,898, filed on Feb. 10, 2005, now Pat. No. 8,098,790, which is a continuation-in-part of application No. 10/803,620, filed on Mar. 18, 2004, now Pat. No. 7,068,748.

(51) Int. Cl.
*G21C 19/00* (2006.01)

(52) U.S. Cl.
USPC ............................... 376/272; 76/260; 76/261

(58) Field of Classification Search
USPC ............ 376/272–274, 347; 250/505.1, 506.1, 250/507.1, 515.1, 273; 220/592.01, 476, 220/484; 427/393.6; 588/1, 3, 20, 249
See application file for complete search history.

(56) References Cited

U.S. PATENT DOCUMENTS

| | | | |
|---|---|---|---|
| 3,111,078 A | 11/1963 | Breckenridge | |
| 3,111,586 A * | 11/1963 | Rogers | 250/507.1 |
| 3,629,062 A | 12/1971 | Muenchow | |
| 3,739,451 A | 6/1973 | Jacobson | |
| 3,745,707 A | 7/1973 | Herr | |
| 3,755,079 A | 8/1973 | Weinstein et al. | |
| 3,765,549 A | 10/1973 | Jones | |
| 3,800,973 A | 4/1974 | Weaver | |
| 3,836,267 A | 9/1974 | Schatz | |
| 3,910,006 A | 10/1975 | James | |

(Continued)

FOREIGN PATENT DOCUMENTS

| | | |
|---|---|---|
| DE | 2821780 | 11/1979 |
| DE | 3107158 | 1/1983 |

(Continued)

OTHER PUBLICATIONS

Zorpette, Glenn: "Cannet Heat", Nuclear Power, Special Report, in IEEE Spectrum, Nov. 2001, pp. 44-47.

(Continued)

*Primary Examiner* — Jack W Keith
*Assistant Examiner* — Marshall O'Connor
(74) *Attorney, Agent, or Firm* — The Belles Group, P.C.

(57) ABSTRACT

Systems and methods for storing radioactive materials that afford adequate ventilation of the cavity in which the radioactive materials are stored. In one aspect, the invention is a method of storing radioactive materials comprising: a) positioning a system comprising a shell forming a cavity and at least one inlet ventilation duct extending from an inlet to an outlet at a bottom portion of the cavity in a below grade hole so that the inlet of the inlet ventilation duct is above grade and the outlet of the inlet ventilation duct into the cavity is below grade; b) introducing engineered till into the hole to circumferentially surround the shell; c) lowering a canister containing radioactive materials into the cavity; and d) subsequent to the canister being lowered into the cavity, placing a lid on the shell.

12 Claims, 19 Drawing Sheets

(56) References Cited

U.S. PATENT DOCUMENTS

| | | | |
|---|---|---|---|
| 3,917,953 | A | 11/1975 | Wodrich |
| 3,935,062 | A | 1/1976 | Keller et al. |
| 3,945,509 | A | 3/1976 | Weems |
| 3,962,587 | A | 6/1976 | Dufrane et al. |
| 3,984,942 | A | 10/1976 | Schroth |
| 4,055,508 | A | 10/1977 | Yoli et al. |
| 4,078,968 | A | 3/1978 | Golden et al. |
| 4,158,599 | A | 6/1979 | Andrews et al. |
| 4,278,892 | A | 7/1981 | Baatz et al. |
| 4,288,698 | A | 9/1981 | Baatz et al. |
| 4,336,460 | A | 6/1982 | Best et al. |
| 4,355,000 | A | 10/1982 | Lumelieau |
| 4,356,146 | A | 10/1982 | Knappe |
| 4,366,095 | A | 12/1982 | Takats et al. |
| 4,394,022 | A | 7/1983 | Gilmore |
| 4,450,134 | A | 5/1984 | Soot et al. |
| 4,498,011 | A | 2/1985 | Dyck et al. |
| 4,525,324 | A | 6/1985 | Spilker et al. |
| 4,526,344 | A | 7/1985 | Oswald et al. |
| 4,527,066 | A | 7/1985 | Dyck et al. |
| 4,532,104 | A | 7/1985 | Wearden et al. |
| 4,532,428 | A | 7/1985 | Dyck et al. |
| 4,585,611 | A | 4/1986 | Perl |
| 4,634,875 | A * | 1/1987 | Kugeler et al. ............ 250/506.1 |
| 4,635,477 | A | 1/1987 | Simon |
| 4,649,018 | A | 3/1987 | Waltersdorf |
| 4,663,533 | A | 5/1987 | Kok et al. |
| 4,666,659 | A | 5/1987 | Lusk et al. |
| 4,671,326 | A | 6/1987 | Wilhelm |
| 4,690,795 | A | 9/1987 | Hardin et al. |
| 4,764,333 | A | 8/1988 | Minsall et al. |
| 4,780,269 | A | 10/1988 | Fischer et al. |
| 4,800,062 | A | 1/1989 | Craig et al. |
| 4,834,916 | A | 5/1989 | Chaudon et al. |
| 4,847,009 | A | 7/1989 | Madle et al. |
| 4,851,183 | A | 7/1989 | Hampel |
| 4,971,752 | A | 11/1990 | Parker |
| 5,102,615 | A | 4/1992 | Grande et al. |
| 5,182,076 | A | 1/1993 | de Seroux et al. |
| 5,267,280 | A | 11/1993 | Duquesne |
| 5,297,917 | A | 3/1994 | Freneix |
| 5,307,388 | A | 4/1994 | Inkester et al. |
| 5,319,686 | A | 6/1994 | Pizzano et al. |
| 5,387,741 | A | 2/1995 | Shuttle et al. |
| 5,469,936 | A | 11/1995 | Lauga et al. |
| 5,513,231 | A | 4/1996 | Jones et al. |
| 5,513,232 | A | 4/1996 | Jones et al. |
| 5,546,436 | A | 8/1996 | Jones et al. |
| 5,564,498 | A | 10/1996 | Bochard |
| 5,633,904 | A | 5/1997 | Gilligan et al. |
| 5,646,971 | A | 7/1997 | Howe |
| 5,661,768 | A | 8/1997 | Gilligan et al. |
| 5,753,925 | A | 5/1998 | Yamanaka et al. |
| 5,771,265 | A | 6/1998 | Montazer |
| 5,852,643 | A | 12/1998 | Copson |
| 5,862,195 | A | 1/1999 | Peterson |
| 5,898,747 | A | 4/1999 | Singh |
| 5,926,602 | A | 7/1999 | Okura |
| 6,064,710 | A | 5/2000 | Singh |
| 6,064,711 | A | 5/2000 | Copson |
| 6,074,771 | A | 6/2000 | Cubukcu et al. |
| 6,252,923 | B1 | 6/2001 | Iacovino et al. |
| 6,489,623 | B1 | 12/2002 | Peters et al. |
| 6,519,307 | B1 | 2/2003 | Singh et al. |
| 6,519,308 | B1 | 2/2003 | Boardman |
| 6,718,000 | B2 | 4/2004 | Singh et al. |
| 6,793,450 | B2 | 9/2004 | Singh et al. |
| 7,068,748 | B2 | 6/2006 | Singh |
| 2002/0003851 | A1 | 1/2002 | Pennington |
| 2004/0067328 | A1 | 4/2004 | Taniuchi et al. |
| 2004/0109523 | A1 | 6/2004 | Singh et al. |

FOREIGN PATENT DOCUMENTS

| | | |
|---|---|---|
| DE | 3144113 | 5/1983 |
| DE | 3151475 | 5/1983 |
| DE | 3404666 | 8/1985 |
| DE | 3515871 | 11/1986 |
| DE | 19529357 | 2/1997 |
| EP | 0253730 | 1/1988 |
| EP | 1061011 | 12/2000 |
| EP | 1312874 | 5/2003 |
| FR | 24344463 | 3/1980 |
| GB | 2295484 | 5/1996 |
| GB | 2337722 | 1/1999 |
| JP | 62185199 | 8/1987 |
| JP | 2001056392 | 2/2001 |
| JP | 2001264483 | 9/2001 |
| RU | 2168022 | 5/2001 |

OTHER PUBLICATIONS

International Atomic Energy Agency, "Multi-purpose container technologies for spent fuel management," Dec. 2000 (IAEA-TECDOC-1192) pp. 1-49.

U.S. Department of Energy, "Conceptual Design for a Waste-Management System that Uses Multipurpose Canisters," Jan. 1994 pp. 1-14.

Federal Register Environmental Documents, "Implementation Plan for the Environmental Impact Statement for a Multi-Purpose Canister System for Management of Civilian and Naval Spent Nuclear Fuel," Aug. 30, 1995 (vol. 60, No. 168) pp. 1-7.

National Conference of State Legislatures, "Developing a Multipurpose Canister System for Spent Nuclear Fuel," State Legislative Report, vol. 19, No. 4 by Sia Davis et al., Mar. 1, 1994, pp. 1-4.

Energy Storm Article, "Multi-purpose canister system evaluation: A systems engineering approach," Author unavailable, Sep. 1, 1994 pp. 1-2.

Science, Society, and America's Nuclear Waste—Teacher Guide, "The Role of the Multi-Purpose Canister in the Waste Management System," Author—unknown, Date—unknown, 5 pgs.

USEC Inc. Article, "NAC International: A Leader in Used Fuel Storage Technologies," copyright 2008, 2 pages.

Federal Register Notice, Dept. of Energy, "Record of Decision for a Multi-Purpose Canister or Comparable System," vol. 64, No. 85, May 4, 1999.

* cited by examiner

SYSTEMS AND METHODS FOR STORING SPENT NUCLEAR FUEL

CROSS-REFERENCE TO RELATED APPLICATIONS

The present application is a continuation of U.S. patent application Ser. No. 11/054,898, filed Feb. 10, 2005, now U.S. Pat. No. 8,098,790 which is a continuation-in-part of U.S. patent application Ser. No. 10/803,620, filed Mar. 18, 2004, and granted as U.S. Pat. No. 7,068,748, the entireties of which are hereby incorporated by reference.

FIELD OF THE INVENTION

The present invention relates generally to the field of storing radioactive materials, and specifically to systems and methods for storing radioactive materials, such as spent nuclear fuel, in ventilated vertical modules.

BACKGROUND OF THE INVENTION

In the operation of nuclear reactors, it is customary to remove fuel assemblies after their energy has been depleted down to a predetermined level. Upon removal, this spent nuclear fuel is still highly radioactive and produces considerable heat, requiring that great care be taken in its packaging, transporting, and storing. In order to protect the environment from radiation exposure, spent nuclear fuel is first placed in a canister. The loaded canister is then transported and stored in large cylindrical containers called casks. A transfer cask is used to transport spent nuclear fuel from location to location while a storage cask is used to store spent nuclear fuel for a determined period of time.

In a typical nuclear power plant, an open empty canister is first placed in an open transfer cask. The transfer cask and empty canister are then submerged in a pool of water. Spent nuclear fuel is loaded into the canister while the canister and transfer cask remain submerged in the pool of water. Once fully loaded with spent nuclear fuel, a lid is typically placed atop the canister while in the pool. The transfer cask and canister are then removed from the pool of water, the lid of the canister is welded thereon and a lid is installed on the transfer cask. The canister is then properly dewatered and filled with inert gas. The transfer cask (which is holding the loaded canister) is then transported to a location where a storage cask is located. The loaded canister is then transferred from the transfer cask to the storage cask for long term storage. During transfer from the transfer cask to the storage cask, it is imperative that the loaded canister is not exposed to the environment.

One type of storage cask is a ventilated vertical overpack ("VVO"). A VVO is a massive structure made principally from steel and concrete and is used to store a canister loaded with spent nuclear fuel. VVOs stand above ground and are typically cylindrical in shape and extremely heavy, weighing over 150 tons and often having a height greater than 16 feet. VVOs typically have a flat bottom, a cylindrical body having a cavity to receive a canister of spent nuclear fuel, and a removable top lid.

In using a VVO to store spent nuclear fuel, a canister loaded with spent nuclear fuel is placed in the cavity of the cylindrical body of the VVO. Because the spent nuclear fuel is still producing a considerable amount of heat when it is placed in the VVO for storage, it is necessary that this heat energy have a means to escape from the VVO cavity. This heat energy is removed from the outside surface of the canister by ventilating the VVO cavity. In ventilating the VVO cavity, cool air enters the VVO chamber through bottom ventilation ducts, flows upward past the loaded canister, and exits the VVO at an elevated temperature through top ventilation ducts. The bottom and top ventilation ducts of existing VVOs are located circumferentially near the bottom and top of the VVO's cylindrical body respectively, as illustrated in FIG. 1.

While it is necessary that the VVO cavity be vented so that heat can escape from the canister, it is also imperative that the VVO provide adequate radiation shielding and that the spent nuclear fuel not be directly exposed to the external environment. The inlet duct located near the bottom of the overpack is a particularly vulnerable source of radiation exposure to security and surveillance personnel who, in order to monitor the loaded overpacks, must place themselves in close vicinity of the ducts for short durations.

Additionally, when a canister loaded with spent nuclear fuel is transferred from a transfer cask to a storage VVO, the transfer cask is stacked atop the storage VVO so that the canister can be lowered into the storage VVO's cavity. Most casks are very large structures and can weigh up to 250,000 lbs. and have a height of 16 ft. or more. Stacking a transfer cask atop a storage VVO/cask requires a lot of space, a large overhead crane, and possibly a restraint system for stabilization. Often, such space is not available inside a nuclear power plant. Finally, above ground storage VVOs stand at least 16 feet above ground, thus, presenting a sizable target of attack to a terrorist.

FIG. 1 illustrates a traditional prior art VVO 2. Prior art VVO 2 comprises flat bottom 17, cylindrical body 12, and lid 14. Lid 14 is secured to cylindrical body 12 by bolts 18. Bolts 18 serve to restrain separation of lid 14 from body 12 if prior art VVO 2 were to tip over. Cylindrical body 12 has top ventilation ducts 15 and bottom ventilation ducts 16. Top ventilation ducts 15 are located at or near the top of cylindrical body 12 while bottom ventilation ducts 16 are located at or near the bottom of cylindrical body 12. Both bottom ventilation ducts 16 and top ventilation ducts 15 are located around the circumference of the cylindrical body 12. The entirety of prior art VVO 2 is positioned above grade.

DISCLOSURE OF THE PRESENT INVENTION

It is an object of the present invention to provide a system and method for storing spent nuclear fuel that reduces the height of the stack assembly when a transfer cask is stacked atop a storage VVO.

It is another object of the present invention to provide a system and method for storing spent nuclear fuel that requires less vertical space.

Yet another object of the present invention is to provide a system and method for storing spent nuclear fuel that utilizes the radiation shielding properties of the subgrade during storage while providing adequate ventilation of the spent nuclear fuel.

A further object of the present invention is to provide a system and method for storing spent nuclear fuel that provides the same or greater level of operational safeguards that are available inside a fully certified nuclear power plant structure.

A still further object of the present invention is to provide a system and method for storing spent nuclear fuel that decreases the dangers presented by earthquakes and other catastrophic events and virtually eliminates the potential damage from a World Trade Center or Pentagon type of attack on the stored canister.

It is also an object of the present invention to provide a system and method for storing spent nuclear fuel that allows an ergonomic transfer of the spent nuclear fuel from a transfer cask to a storage VVO.

Another object of the present invention is to provide a system and method for storing spent nuclear fuel below grade.

Yet another object of the present invention is to provide a system and method of storing spent nuclear fuel that reduces the amount of radiation emitted to the environment.

Still another object of the present invention is to provide a system and method of storing spent nuclear fuel that affords adequate heat removal capabilities from a stored canister during flood conditions, including "smart flood" conditions.

These and other objects are met by the present invention which in one aspect is a method of storing radioactive materials comprising: a) positioning a system comprising a shell forming a cavity and at least one inlet ventilation duct extending from an inlet to an outlet at a bottom portion of the cavity in a below grade hole so that the inlet of the inlet ventilation duct is above grade and the outlet of the inlet ventilation duct into the cavity is below grade; b) introducing engineered fill into the hole to circumferentially surround the shell; c) lowering a canister containing radioactive materials into the cavity; and d) subsequent to the canister being lowered into the cavity, placing a lid on the shell.

In another aspect, the invention can be a method of storing radioactive materials comprising: a) providing a system comprising a structure forming a cavity, the cavity having a top portion and a bottom portion, at least one inlet ventilation duct forming a passageway from an ambient air inlet to an outlet at the bottom portion of the cavity, and at least one outlet ventilation duct forming a passageway from the top portion of the cavity to ambient air; b) lowering a canister loaded with radioactive materials into the cavity until a bottom surface of the canister is lower than a top of the outlet of the at least one inlet ventilation duct; c) supporting the canister in the cavity in a position where the bottom surface of the canister is lower than the top of the outlet of the at least one inlet ventilation duct, wherein the inlet ventilation duct is shaped so that a line of sight does not exist to the canister from the ambient air inlet through the at least one inlet ventilation duct; and d) placing a lid atop of the structure.

In yet another aspect, the invention can be A method of storing radioactive materials having a low level heat load comprising: a) positioning a system comprising a structure forming a cavity in a below grade opening so that at least a portion of the cavity is below a grade level, wherein the cavity is hermetically sealed to ingress of below grade fluids; b) lowering a canister containing radioactive materials having a low heat load into the cavity until at least a major portion of the canister is below the grade level; and c) subsequent to the canister being lowered into the cavity, placing a lid on the structure, the lid comprising at least one ventilation duct that forms a passageway from a top portion of the cavity to an ambient atmosphere.

DETAILED DESCRIPTION OF THE DRAWINGS

Figure 1:
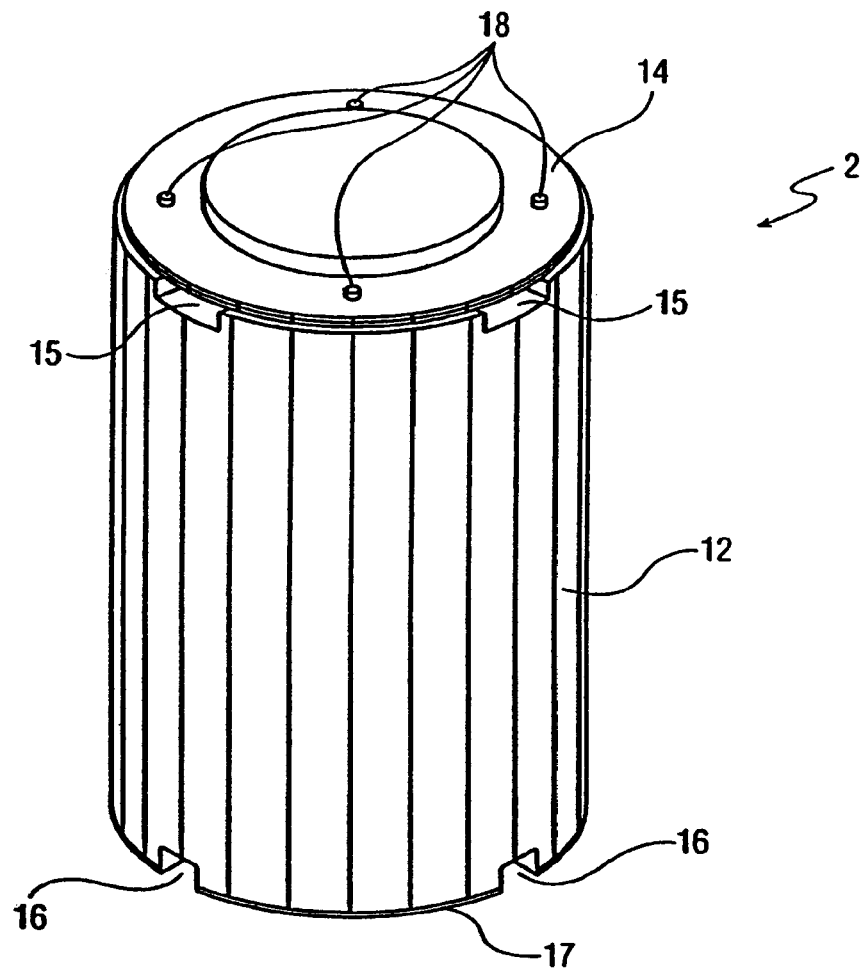
FIG. 1 is a top perspective view of a prior art VVO.
Figure 2:
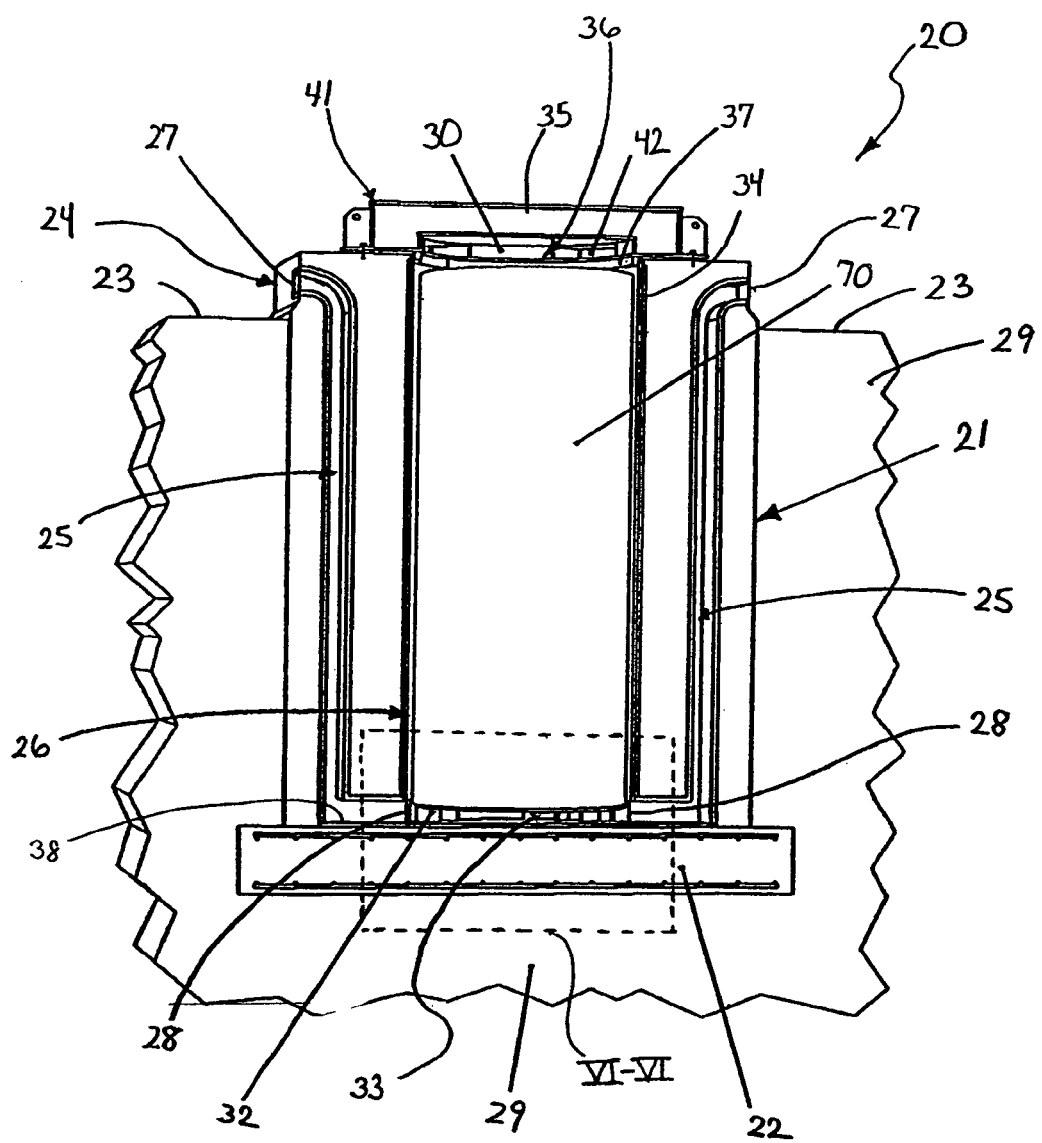
FIG. 2 is a side cross sectional view of an underground VVO according to an embodiment of the present invention having a spent fuel canister positioned therein.
Figure 3:
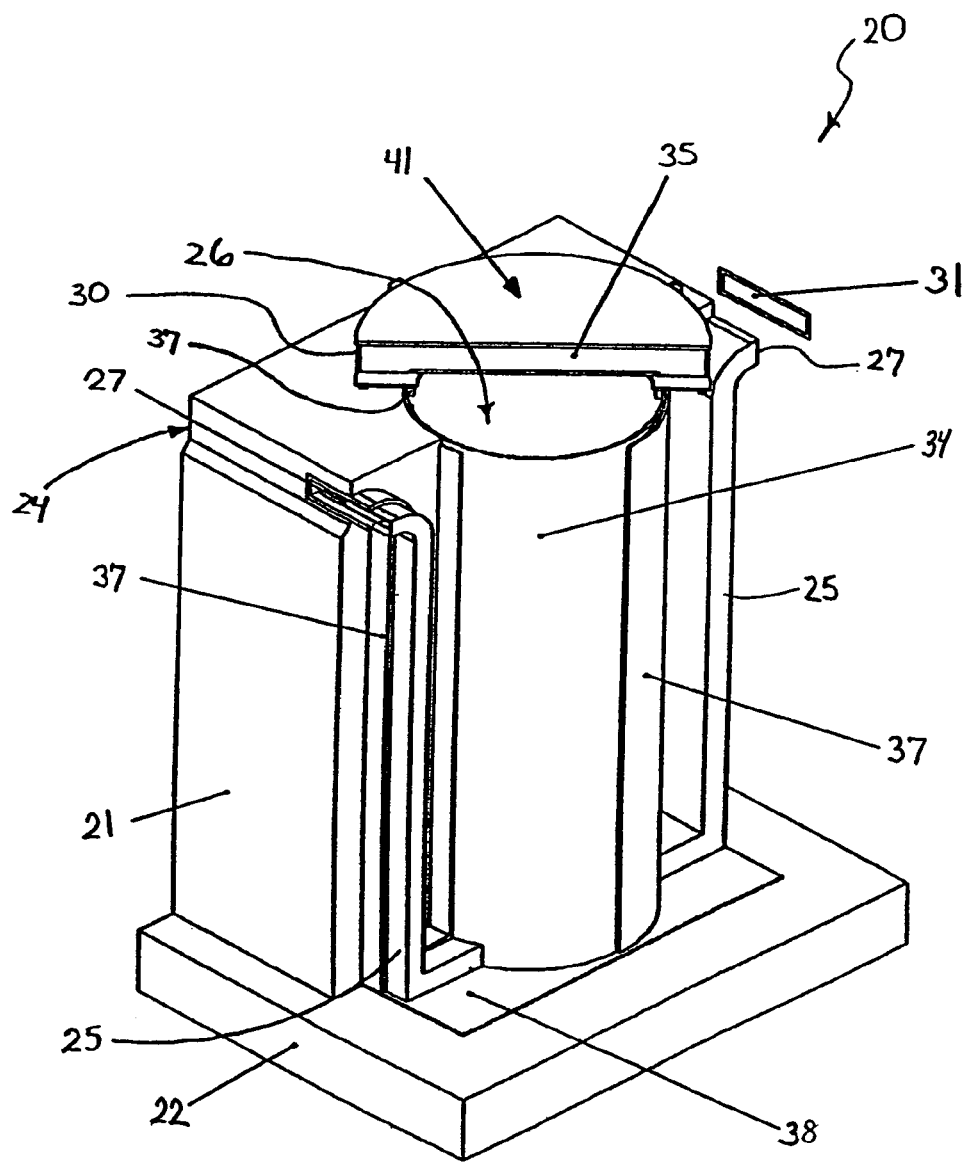
FIG. 3 is a perspective view of the underground VVO of FIG. 2 removed from the ground.

Referring to FIGS. 2 and 3, underground VVO 20 is illustrated according to a first embodiment of the present invention. Underground VVO 20 is a vertical, ventilated dry spent fuel storage system that is fully compatible with 100 ton and 125 ton transfer casks for spent fuel canister transfer operations. Underground VVO 20 can be modified/designed to be compatible with any size or style transfer cask. Underground VVO 20 is designed to accept spent fuel canisters for storage at an Independent Spent Fuel Storage Installation "ISFSI") in lieu of above ground overpacks (such as prior art VVO 2 in FIG. 1). All spent fuel canister types engineered for storage in free-standing and anchored overpack models can be stored in underground VVO 20.

As used herein the term "canister" broadly includes any spent fuel containment apparatus, including, without limitation, multi-purpose canisters and thermally conductive casks.

For example, in some areas of the world, spent fuel is transferred and stored in metal casks having a honeycomb gridwork/basket built directly into the metal cask. Such casks and similar containment apparatus qualify as canisters, as that term is used herein, and can be used in conjunction with underground VVO 20 as discussed below.

Underground VVO 20 comprises body 21, base 22, and removable lid 41. Body 21 is constructed of concrete, but can be constructed of other suitable materials. Body 21 is rectangular in shape but can be any shape, such as for example, cylindrical, conical, spherical, semi-spherical, triangular, or irregular in shape. A portion of body 21 is positioned below grade so that only top portion 24 protrudes above grade level 23. Preferably, at least a major portion of the height of body 21 is positioned below grade. The exact height which top portion 24 of body 21 extends above ground level 23 can be varied greatly and will depend on a multitude of design considerations, such as canister dimensions, radioactivity levels of the spent fuel to be stored, ISFSI space limitations, geographic location considering susceptibility to missile-type and ground attacks, geographic location considering frequency of and susceptibility to natural disasters (such as earthquakes, floods, tornadoes, hurricanes, tsunamis, etc.), environmental conditions (such as temperature, precipitation levels), and/or ground water levels. Preferably, top portion 24 of body 21 is less than approximately 42 inches above ground level 23, and most preferably approximately 6 to 36 inches above ground level 23.

Figure 8A:
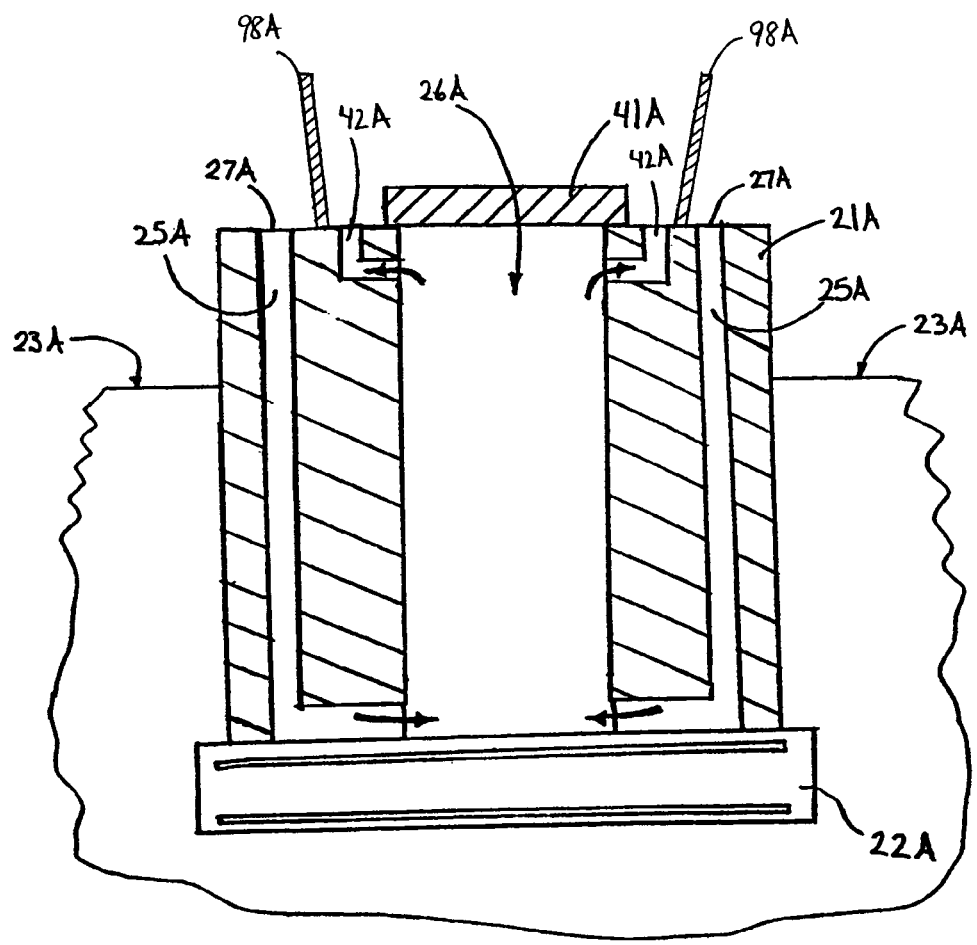
FIG. 8A is a schematic cross-sectional view of an underground VVO according to an embodiment of the present invention having a first alternative configuration of the inlet and outlet ventilation ducts.
Figure 8B:
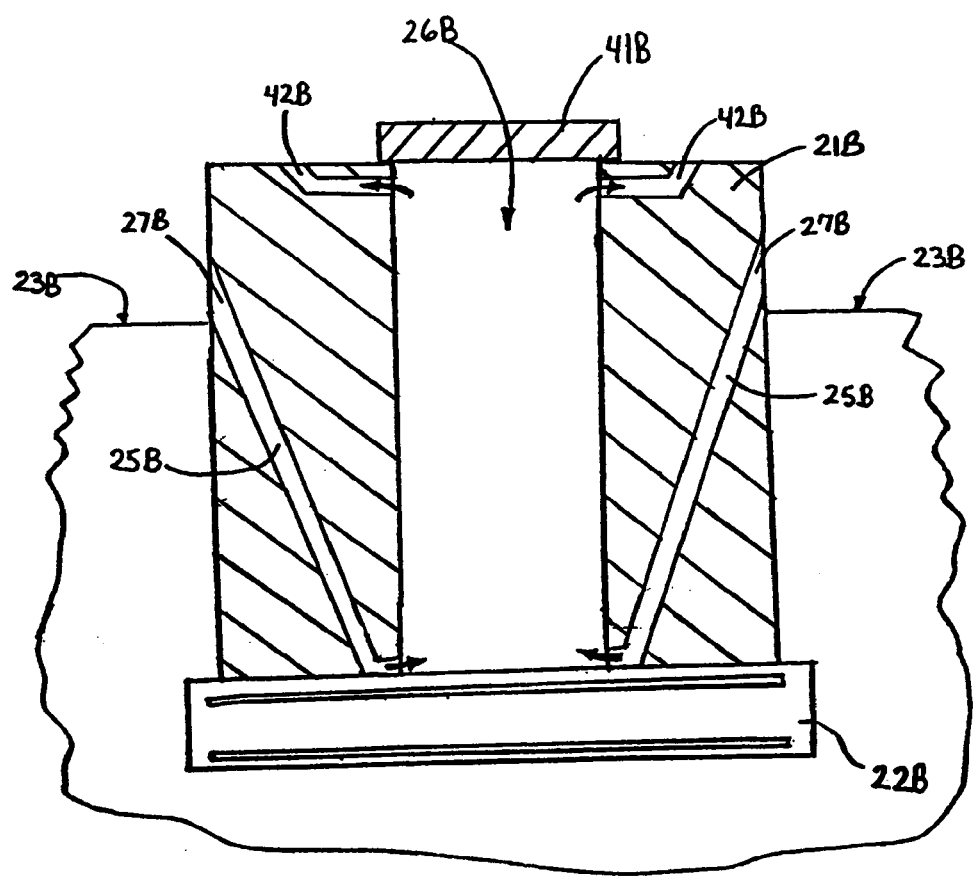
FIG. 8B is a schematic cross-sectional view of an underground VVO according to an embodiment of the present invention having a second alternative configuration of the inlet and outlet ventilation ducts.
Figure 8C:
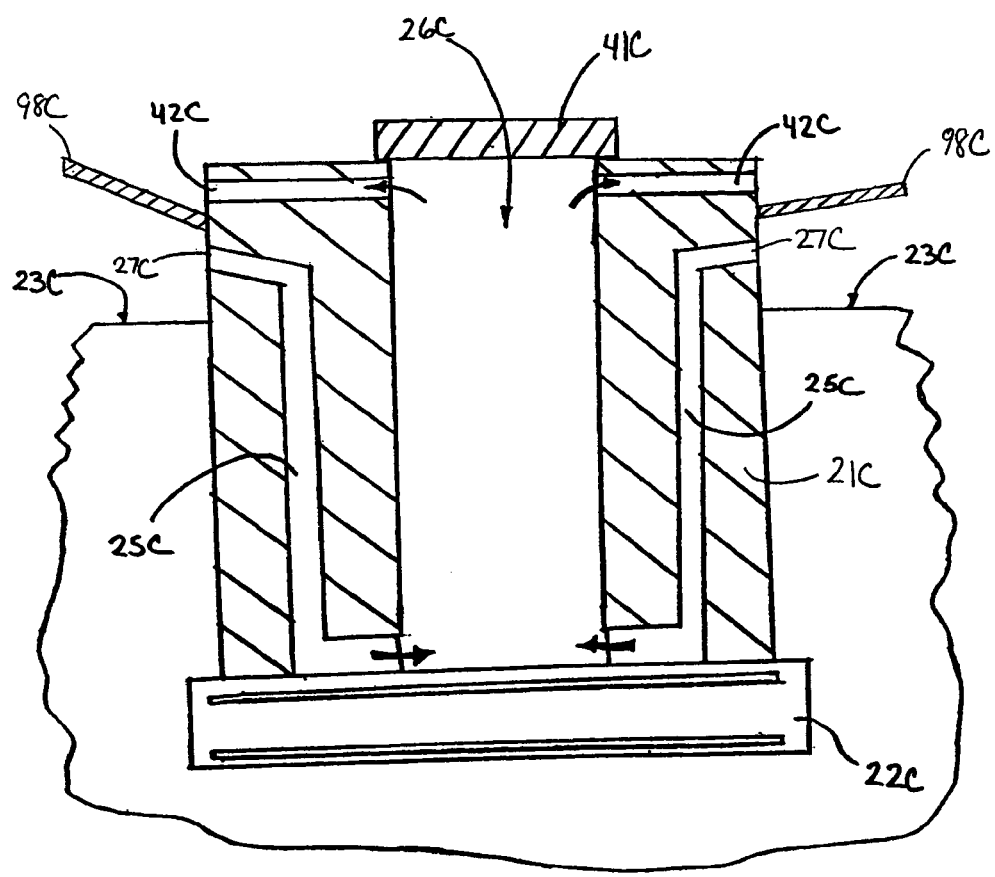
FIG. 8C is a schematic cross-sectional view of an underground VVO according to an embodiment of the present invention having a third alternative configuration of the inlet and outlet ventilation ducts.
Figure 8D:
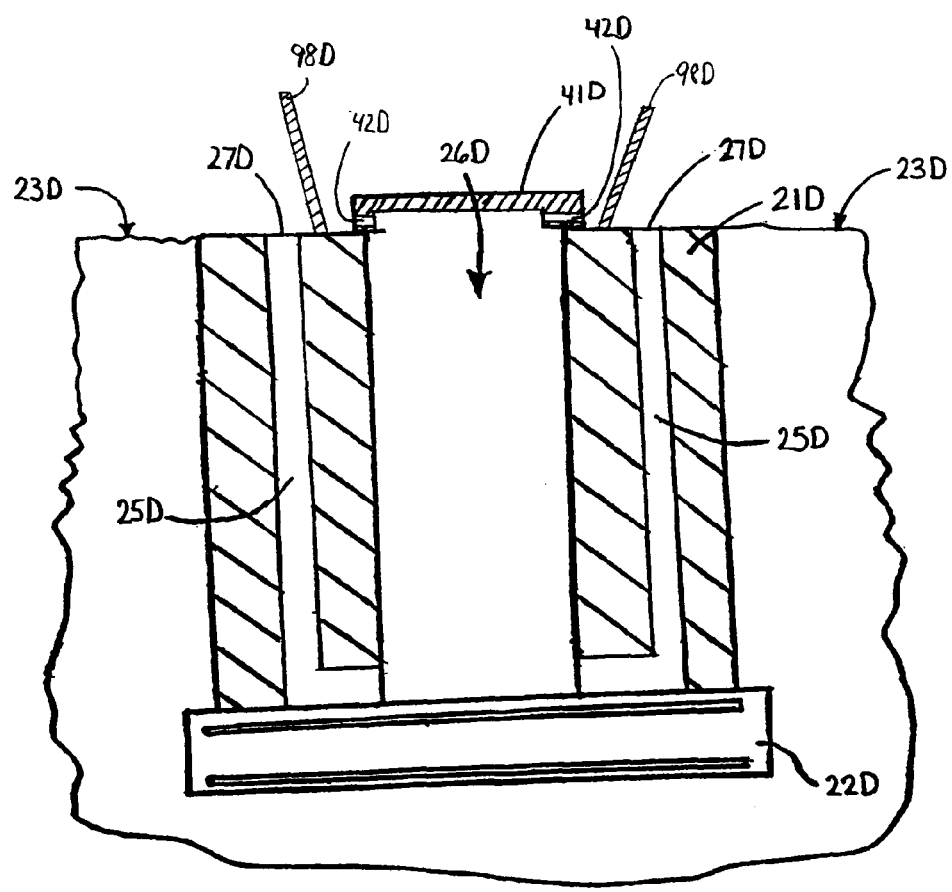
FIG. 8D is a schematic cross-sectional view of an underground VVO according to an embodiment of the present invention wherein the body of the underground VVO is substantially flush with the ground.
Figure 8E:
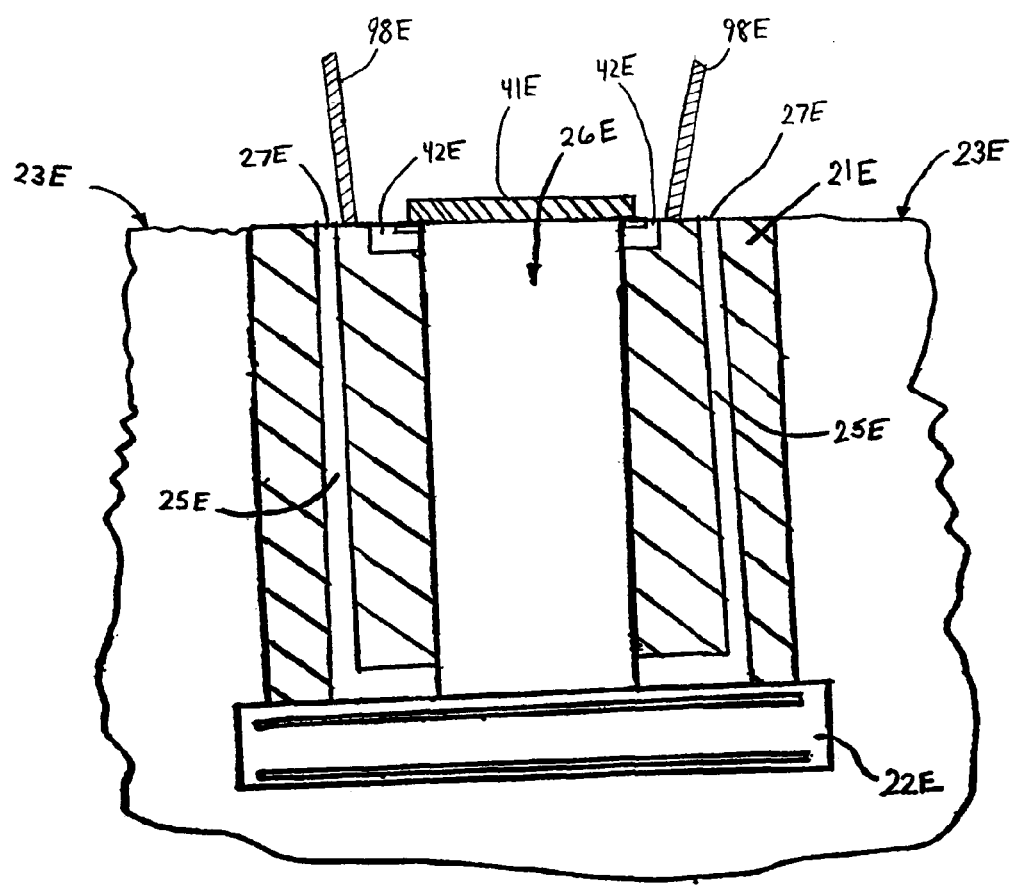
FIG. 8E is a schematic cross-sectional view of an underground VVO according to an embodiment of the present invention wherein the body of the underground VVO is substantially flush with the ground and having an alternative configuration of the inlet and outlet ventilation ducts.

In some embodiments, it may even be preferable that the entire height of body 21 be below grade (illustrated in FIGS. 8D and 8E). As will be discussed in more detail below, when the entire height of body is below grade, only the top surface of the body will be exposed to the ambient air above grade.

Referring still to FIGS. 2 and 3, body 21 forms cylindrical cavity 26 therein (best shown in FIG. 3). While cavity 26 is cylindrical in shape, cavity 26 is not limited to any specific size, shape, and/or depth and can be designed to receive and store almost any shape of canister without departing from the spirit of the invention. While not necessary to practice the invention, it is preferred that the horizontal cross-sectional size and shape of cavity 26 be designed to generally correspond to the horizontal cross-sectional size and shape of the canister-type that is to be used in conjunction with that particular underground VVO. More specifically, it is desirable that the size and shape of cavity 26 be designed so that when a spent fuel canister (such as canister 70) is positioned in cavity 26 for storage, a small clearance exists between the outer side walls of the canister and the side walls of cavity 26.

Designing cavity 26 so that a small clearance is formed between the side walls of the stored canister and the side walls of cavity 26 limits the degree the canister can move within the cavity during a catastrophic event, thereby minimizing damage to the canister and the cavity walls and prohibiting the canister from tipping over within the cavity. This small clearance also facilitates flow of the heated air during spent nuclear fuel cooling. The exact size of the clearance can be controlled/designed to achieve the desired fluid flow dynamics and heat transfer capabilities for any given situation. In some embodiments, for example, the clearance may be 1 to 3 inches. A small clearance also reduces radiation streaming.

Two inlet ventilation ducts 25 are provided in body 21 for providing inlet ventilation to the bottom of cavity 26. Inlet ventilation ducts 25 are elongated substantially S-shaped passageways extending from above grade inlets 27 to below grade outlets 28. Above grade inlets 27 are located on opposing side walls of top portion 24 of body 21 and open to the ambient air above ground level 23. As use herein, the terms ambient air, ambient atmosphere, or outside atmosphere, refer to the atmosphere/air external to the underground VVO, and include the natural outside environment and spaces within buildings, tents, caves, tunnels, or other man-made or natural enclosures.

Below grade outlets 28 open into cavity 26 at or near its bottom at a position below the ground level 23. Thus, inlet ventilation ducts 25 provide a passageway for the inlet of ambient air to the bottom of cavity 26, despite the bottom of cavity 26 being well below grade. Vent screens 31 (FIG. 3) are provided to cover above grade inlets 27 so that objects and other debris can not enter and block the passageways of inlet ventilation ducts 25. As a result of the elongated S-shape of inlet ventilation ducts 25, above grade inlets 27 cease to be a location of elevated dose rate that is common in free-standing above ground VVOs. While below grade outlets 28 are illustrated as being opening near the bottom of the walls of cavity 26, below grade outlets 28 can be located in the floor of cavity 26 is desired. This can be accomplished by appropriately reshaping inlet ventilation ducts 25 and forming an opening through bottom plate 38 and into cavity 26. In such an embodiment, base 22 can be considered part of the body 21 through which the inlet ventilation ducts 25 extend.

Above grade inlets 27 are located in the side walls of body 21 at an elevation of about 10 inches above ground level 23. However, the elevation of above grade inlets 27 is not limiting of the present invention. The inlets 27 can be located at any desired elevation above the ground level, including level/flush therewith, as shown in FIGS. 8D and 8E. Elevating above grade inlets 27 substantially above the ground level 23 helps reduce the likelihood that rain or flood water will enter the cavity 26. It is noted that for IFSI's in flood zones, floodwater can possibly rise more than a foot above ground level and, thus, enter cavity 26 via inlet ventilation ducts 25. However, as discussed below with respect to FIG. 6, underground VVO 20 is specifically designed to deal with the worst flood conditions in a safe and effective manner.

While above grade inlets 27 are preferably located in the side walls of body 21, the above grade inlets are not limited to such a location and, if desired, can be located anywhere on the body, including for example in the top surface (or any other surface) of the body. Further examples of possible locations for above grade inlets 27 on body 21 are illustrated in FIGS. 8A-8E.

Referring still to FIGS. 2 and 3, inlet ventilation ducts 25 have a rectangular cross-sectional area of about 6 inches by 40 inches. However, any cross-sectional shape and/or size can be used, such as for example, round, elliptical, triangular, hexagonal, octagonal, etc. Additionally, while the shape of inlet ventilation ducts 25 is an elongated substantially S-shaped passageway, a multitude of shapes can be used that still achieve acceptable dose rates at the above grade inlets 27. For example, rather than an elongated S-shape, the inlet ventilation duct can extend from the above grade inlet to the below grade outlet in a zig-zag shape, a tilted linear shape, a general L-shape, or any angular, linear, or curved combination. The exact shape, size, and cross-sectional configuration of the inlet ventilation duct is a matter of design preference and will be dictated by such factors, such as thickness of the body of the VVO, radioactivity level of the spent fuel being stored in the cavity, temperature of the spent fuel canister, desired fluid flow dynamics through the ducts, and placement of the above grade inlet vents on the body (i.e., whether the above grade inlet vents/opening are located on the side walls of the body, its top surface, or some other surface of the body). Further examples of possible shapes for inlet ventilation ducts 25 are illustrated in FIGS. 8A-8E.

Inlet ventilation ducts 25 are preferably formed by a low carbon steel liner. However, inlet ventilation ducts 25 can be made of any material or can be mere passageways formed into concrete body 21 without a lining.

As best illustrated in FIG. 3, cavity 26 is formed by thick steel shell 34 and bottom plate 38. Shell 34, bottom plate 38, and inlet ventilation ducts 25 are preferably made of a metal, such as steel, preferably low carbon steel, but can be made of other materials, such as stainless steel, aluminum, aluminum-alloys, plastics, and the like. Inlet ventilation ducts 25 are seal joined to shell 34 and bottom plate 38 to form an integral/unitary structure 100 (shown in isolation in FIG. 9) that is hermetically sealed to the ingress of below grade water and other fluids. In the case of weldable metals, this seal joining may comprise welding or the use of gaskets. Thus, the only way water or other fluids can enter cavity 26 is through above grade inlets 27 or outlet ventilation ducts 42 in lid 41. As will be discussed below with respect to FIGS. 9-15, the integral structure itself is an invention and can be used to store spent nuclear fuel without the use of body 21.

An appropriate preservative, such as a coal tar epoxy or the like, is applied to the exposed surfaces of shell 34, bottom plate 38, and inlet ventilation ducts 25 in order to ensure sealing, to decrease decay of the materials, and to protect against fire. A suitable coal tar epoxy is produced by Carboline Company out of St. Louis, Mo. under the tradename Bitumastic 300M. In some embodiments of the underground VVO of the present invention, a bottom plate will not be used.

Concrete body 21 surrounds shell 34 and inlet ventilation ducts 25. Body 21 provides non-structural protection for shell 34 and inlet ventilation ducts 25. Insulation 37 is provided at the interface between shell 34 and concrete body 21 and at the interface between inlet ventilation ducts 25 and concrete body 21. Insulation 37 is provided to prevent excessive transmission of heat decay from spent fuel canister 70 to concrete body 21, thus maintaining the bulk temperature of the concrete within FSAR limits. Insulating shell 34 and inlet ventilation ducts 25 from concrete body 21 also serves to minimize the heat-up of the incoming cooling air before it enters cavity 26. Suitable forms of insulation include, without limitation, blankets of alumina-silica fire clay (Kaowool Blanket), oxides of alimuna and silica (Kaowool S Blanket), alumina-silica-zirconia fiber (Cerablanket), and alumina-silica-chromia (Cerachrome Blanket).

Insulating inlet ventilation ducts 25 from the heat load of spent fuel in cavity 26 is very important in facilitating and maintaining adequate ventilation/cooling of the spent fuel. The insulating process can be achieved in a variety of ways, none of which are limiting of the present invention. For example, in addition to adding an insulating material to the exterior of the shell 34 and inlet ventilation ducts 25, it is also possible to insulate inlet ventilation ducts 25 by providing a gap in concrete body 21 between cavity 26 and inlet ventilation ducts 25. The gap may be filled with an inert gas or air if desired. Moreover, irrespective of the means used to provide the insulating effect, the insulating means is not limited to being positioned on the outside surfaces of shell 34 or inlet ventilation ducts 25 but can be positioned anywhere between cavity 26 and inlet ventilation ducts 25.

Body 21, along with the integral steel unit formed by bottom plate 38, shell 34, and ventilation ducts 25, are placed atop base 22. Base 22 is a reinforced concrete slab designed to satisfy the load combinations of recognized industry standards, such as, without limitation, ACI-349. Base 22 is rectangular in shape but can take on any shape necessary to support body 21, such as round, elliptical, triangular, hexagonal; octagonal, irregularly shaped, etc. While using a base is preferable to achieve adequate load supporting requirements, situations can arise where using such a base may be unnecessary.

Referring back to FIG. 2, underground VVO 20 has a removable ventilated lid 41. Lid 41 is positioned atop body 21, thereby substantially enclosing cavity 26 so that radiation does not escape through the top of cavity 26 when canister 70 is positioned in cavity 26. When lid 41 is placed atop body 21 and spent fuel canister 70 is positioned in cavity 26, outlet air plenum 36 is formed between the top surface of canister 70 and lid 41. Outlet air plenum 36 is preferably a minimum of 3 inches in height, but can be any desired height. The exact height will be dictated by design considerations such as desired fluid flow dynamics, canister height, VVO height, the depth of the cavity, canister heat load, etc.

Lid 41 has four outlet ventilation ducts 42. Outlet ventilation ducts 42 form a passageway from the top of cavity 26 (specifically from outlet air plenum 36) to the ambient air so that heated air can escape from cavity 26. Outlet ventilation ducts 42 are horizontal passageways that extend through side wall 30 of lid 41. However, the outlet ventilation ducts can be any shape or orientation, such as vertical, L-shaped, S-shaped, angular, curved, etc. Because outlet ventilation ducts 42 are located within lid 41 itself, the total height of body 21 is minimized.

Lid 41 comprises a roof 35 made of concrete. Roof 35 provides radiation shielding so that radiation does not escape from the top of cavity 26. Side wall 30 of lid 41 is an annular ring. Outlet air plenum 36 helps facilitate the removal of heated air via outlet ventilation ducts 42. In order to minimize the heated air exiting outlet ventilation ducts 42 from being siphoned back into inlet ventilation ducts 25, outlet ventilation ducts 42 are azimuthally and circumferentially separated from inlet ventilation ducts 25.

Ventilated lid 41 also comprises shear ring 47. When lid 41 is placed atop body 21, shear ring 47 protrudes into cavity 26, thus, providing enormous shear resistance against lateral forces from earthquakes, impactive missiles, or other projectiles. Lid 41 is secured to body 21 with bolts (not shown) that extend therethrough.

While not illustrated, it is preferable that duct photon attenuators be inserted into all of inlet ventilation ducts 25 and/or outlet ventilation ducts 42 of underground VVO 20, irrespective of shape and/or size. A suitable duct photon attenuator is described in U.S. Pat. No. 6,519,307, Bongrazio, the teachings of which are incorporated herein by reference.

Figure 4:
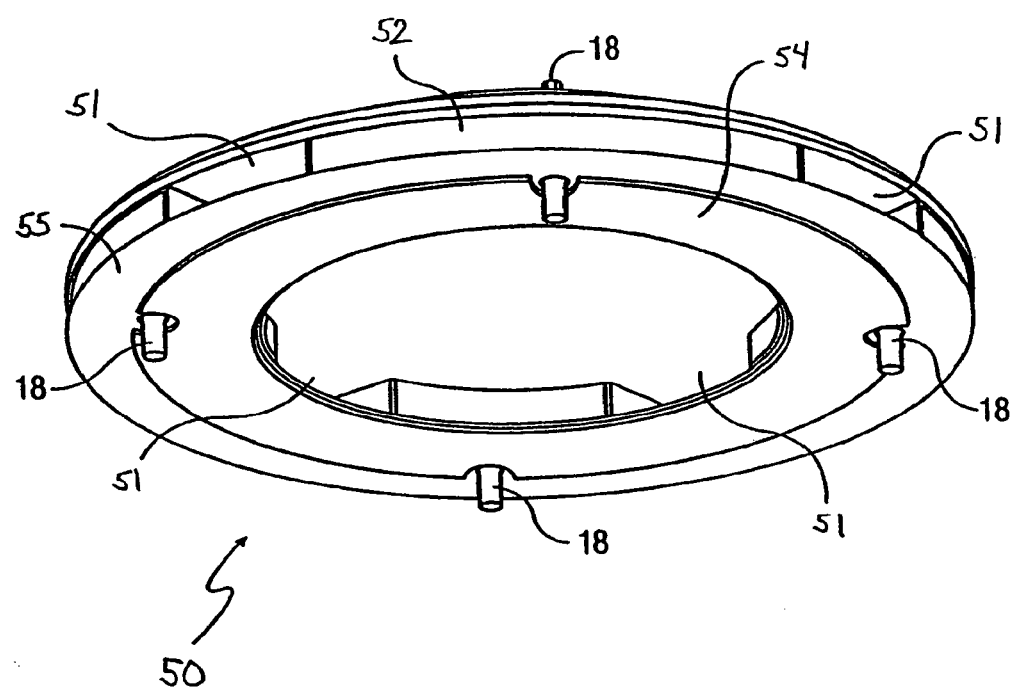
FIG. 4 is a bottom perspective view of an alternate embodiment of a lid to be used with the underground VVO of FIG. 2.

Referring now to FIG. 4, an embodiment of a lid 50 that can be used in underground VVO 20 is illustrated. Lid 50 contains similar design aspects as lid 41 and is illustrated to more fully disclose the aforementioned lid design aspects. Lid 50 has four horizontal outlet ventilation ducts 51 in side wall 52. Shear ring 54 is provided on the bottom of lid 50 to fit into cavity 26. Bolts 18 are used to secure lid 50 to tapped holes in the top of body 21.

While the outlet ventilation ducts are illustrated as being located within the lid 50 of underground VVO 20, the present invention is not so limited. For example, outlet ventilation ducts can be located in the body of the underground VVO at a location above grade. This concept is illustrated if FIGS. 8A-8E. If the outlet ventilation ducts are located in the body of the underground VVO, the openings of the outlet ventilation ducts to the ambient air can be located in the body's side walls, on its top surface, or in any other surface. Similar to when the outlet ventilation ducts are located in the lid, the outlet ventilation ducts can take on a variety of shapes and/or configurations when located in the body of the underground VVO itself. As with the inlet ventilation ducts, the outlet ventilation ducts are preferably formed by a low carbon steel liner, but can be made of any material or can be mere passageways formed into concrete body 21 or lid 41 without a lining. In all embodiments of the present invention which have both inlet and outlet ventilation ducts, it is preferred that the outlet ventilation duct openings be azimuthally and circumferentially separated from the inlets of the inlet ventilation ducts to minimize interaction between inlet and outlet air streams. There is no limitation on the shape and style of lid used in conjunction with underground VVO 20.

Referring back to FIG. 2, soil 29 surrounds body 21 for almost the entirety of its height. When spent fuel canister 70 is positioned in cavity 26, at least a major portion, if not the entirety, of canister 70 is below grade. Preferably, the entire height of canister 70 is below grade in order to take full advantage of the shielding effect of the soil 29. Thus, soil 29 provides a degree of radiation shielding for spent fuel stored in underground VVO 20 that can not be achieved in above-ground overpacks. Underground VVO 20 is unobtrusive in appearance and there is no danger of underground VVO 20 tipping over. Additionally, underground VVO 20 does not have to contend with soil-structure interaction effects that magnify the free-field acceleration and potentially challenge the stability of an above ground free-standing overpack.

Figure 6:
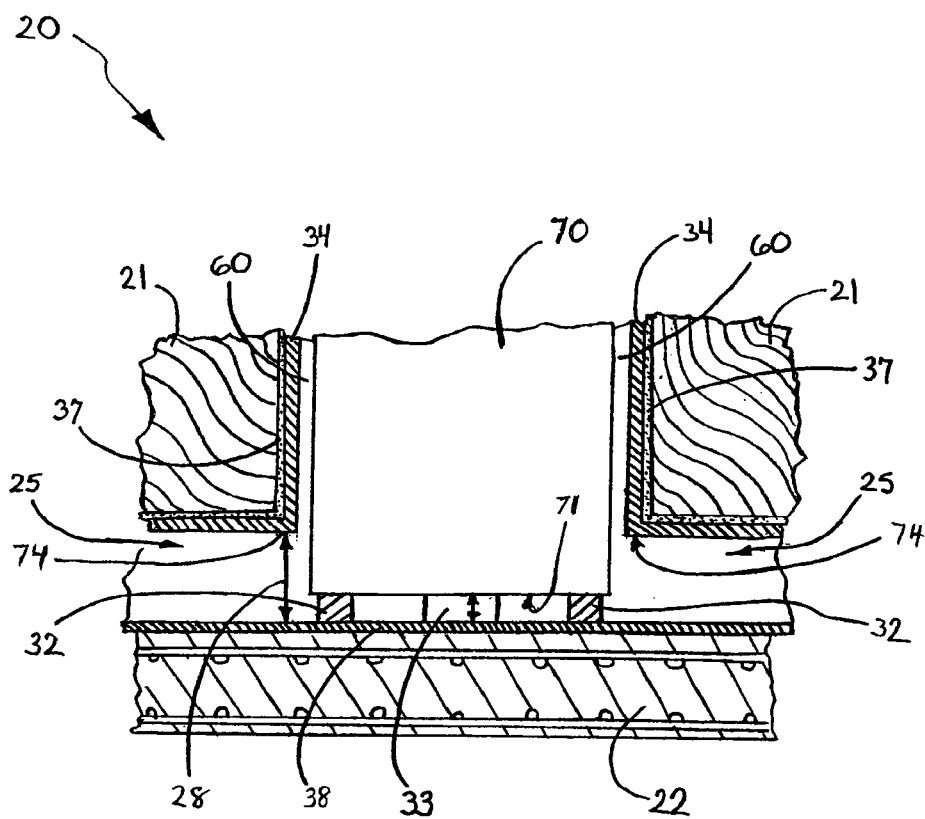
FIG. 6 is a side cross sectional view of area VI-VI of FIG. 2.
Figure 7:
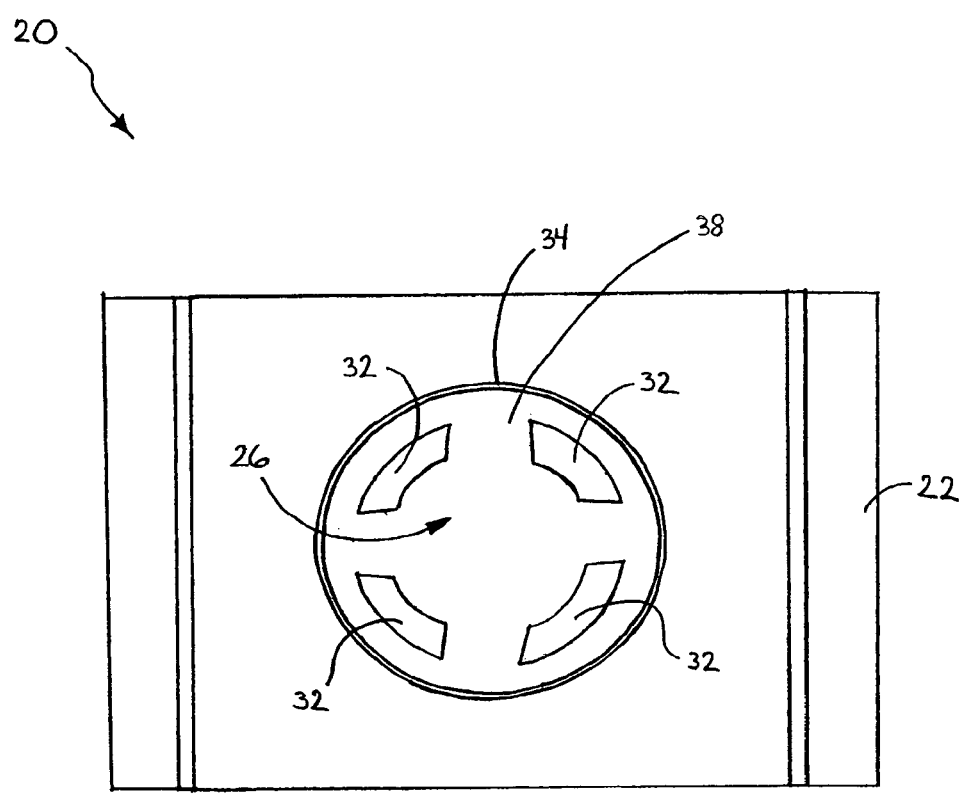
FIG. 7 is a top view of the underground VVO of FIG. 2 removed from the ground and with the spent fuel canister removed from the cavity and the lid removed.

Referring to FIG. 6, area VI-VI of FIG. 2 is illustrated in detail. FIG. 6 illustrates design aspects that are important to ensure that underground VVO 20 can successfully withstand flood conditions without adverse impact. Support blocks 32 are provided on the bottom surface (formed by plate 38) of cavity 26 so that canister 70 can be placed thereon. Support blocks 32 are circumferentially spaced from one another (shown in FIG. 7). When canister 70 is loaded into cavity 26 for storage, the bottom surface 71 of canister 70 rests on support blocks 32, forming an inlet air plenum 33 between the bottom surface 71 of the canister 70 and the bottom surface/floor of cavity 26. Support blocks 32 are made of low carbon steel and are preferably welded to the bottom surface of the cavity 26. Other suitable materials of construction include, without limitation, reinforced-concrete, stainless steel, and other metal alloys.

Support blocks 32 also serve an energy/impact absorbing function. Support blocks 32 are preferably of a honeycomb grid style, such as those manufactured by Hexcel Corp., out of California, U.S.

Support blocks 32 are specifically designed so that bottom surface 71 of canister 70 is lower than top 74 of below grade outlets 28 (FIG. 2) of inlet ventilation ducts 25. Preferably, support blocks 32 are designed so that bottom surface 71 of canister 70 is about 2 to 6 inches below top 74 of below grade outlets 28. However, any desired height differential can be achieved through proper design. By supporting canister 70 in cavity 26 so that its bottom surface 71 is lower than top 74 of below grade outlets 28, underground VVO 20 will provide adequate cooling to canister 70 under even the most adverse flood condition, which is colloquially referred to as a "smart flood." A "smart flood" is one that floods the VVO so that the water level is just high enough to block airflow though the inlet ventilation ducts 25 completely. In other words, the water level is just even with top 74 of the below grade outlets 28.

However, underground VVO 20 can adequately deal with the "smart flood" condition because the bottom surface 71 of the canister 70 is situated at a height that is below top 74 of below grade outlets 28. As a result, if a "smart flood" was to occur, the bottom of the canister 70 will be in contact with (i.e. submerged in) the water. Because the heat removal efficacy of water is over 100 times that of air, a wet bottom is all that is needed to effectively remove heat and keep the canister 70 cool. The deeper the submergence of canister 70 in the water, the cooler canister 70 and its contained fuel will remain. As the water in cavity 26 is heated by the bottom of canister 70, the water evaporates, rises through cavity 26 via annular space 60, and exits cavity 26 via the outlet ventilation ducts. Thus, the canister cooling action changes from ventilation air-cooling to evaporative water cooling.

In one embodiment, below grade outlets 28 of inlet ventilation ducts 25 will be 8 inches high by 40 inches wide and inlet air plenum 33 is 6 inches high. This provides a height differential of 2 inches.

It should be noted that the height differential design aspect of underground VVO 20 that is detailed in FIG. 6 can also be incorporated into free-standing above ground casks and VVOs to deal with "smart flood" conditions, independent of the other features of underground VVO 20. Thus, this concept is an independent inventive aspect of the present application. When incorporated into above ground VVOs, the inlet ventilation ducts should be designed so that radiation can not escape to the surrounding environment from the inlet ventilation ducts. This is a threat because the canister will be below the inlet duct's opening into the storage cavity. In this embodiment, the inlet ventilation ducts will be shaped so that a line of sight does not exist to the canister in the storage cavity from the ambient air. For example, the inlet ventilation ducts can comprise a portion that is L-shaped, angled, S-shaped, or curved.

Moreover, while the height differential design aspect of FIG. 6 is achieved using support blocks 32, it is also possible to practice this aspect of the invention without support blocks 32. In such embodiments, canister 70 will be positioned in cavity 26 and rest directly on the floor of cavity 26. However, the use of support blocks 32 is desirable because of the creation of air inlet plenum 33 and because the use of support blocks 32 helps prohibit debris and dirt from getting trapped at the bottom of cavity 26.

Referring now to FIGS. 8A-8E, examples of alternative configurations of the outlet ventilation ducts and the inlet ventilation ducts in an underground VVO according to the present invention are schematically illustrated. Much of the detail, and some structure, has been omitted in FIGS. 8A-8E for simplicity with the understanding that any or all of the details discussed above with respect to underground VVO 20 can be incorporated therein. Like numbers are used to identify like parts with the exception of alphabetical suffixes being used for each embodiment.

It should be noted that, in addition to the configurations of the inlet ventilation ducts and the outlet ventilation ducts illustrated in FIGS. 8A-8E, a multitude of other configurations, combinations, and modifications can be incorporated into the present invention. Some of these details are discussed above. Additionally, the outlet ventilation duct configurations of any of the illustrated embodiments can be combined with any of the illustrated inlet ventilation duct configurations, and vice versa.

In all embodiments of the present invention, it is desirable that the heated air exiting the outlet ventilation ducts 42 be prohibited from being siphoned back into the inlet ventilation ducts 25 (i.e., keeping the warm outlet air stream from mixing with the cool inlet air stream). This can be accomplished by in a number of ways, including: (1) the positioning/placement of the inlets 27 on the underground VVO 20 with respect to the outlets of the outlet ventilation ducts 42; providing a plate 98 or other structure that segregates the air streams (as exemplified in FIGS. 8A and 8C-8E); and/or (3) extending the inlet ventilation ducts 25 to a position away from the outlet ventilation ducts 42.

As a result of the heat emanating from canister 70, cool air from the ambient is siphoned into inlet ventilation ducts 25 and into the bottom of cavity 26. This cool air is then warmed by the heat from the spent fuel in canister 70, rises in cavity 26 via annular space 60 (FIG. 6) around canister 70, and then exits cavity 26 as heated air via outlet ventilation ducts 42 in lid 41.

Figure 5:
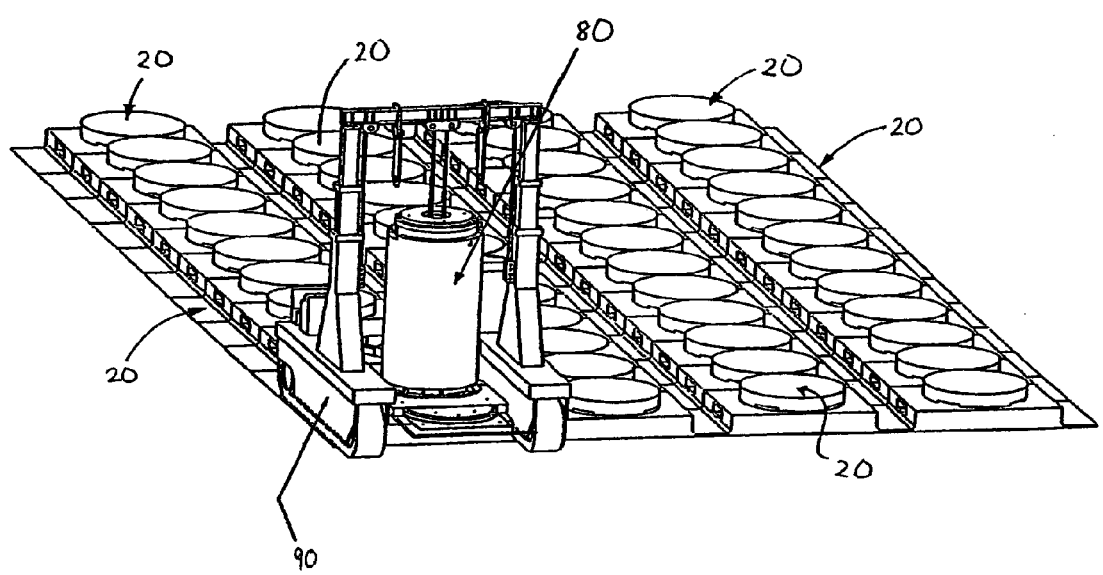
FIG. 5 is a perspective view of an array of underground VVO's according to an embodiment of the present invention stored at an ISFSI.

Referring now to FIG. 5, ISFIs can be designed to employ any number of underground VVOs 20 (or integral structures 100) and can be expanded in number easily to meet growing needs. Although underground VVOs 20 are closely spaced, the design permits any cavity to be independently accessed by cask crawler 90 with ease. The subterranean configuration of underground VVOs 20 greatly reduce the height of the stack structures created during loading/transfer procedures where transfer cask 80 is positioned atop underground VVO 20.

An embodiment of a method of using underground VVO 20 to store spent nuclear fuel canister 70 will now be discussed in relation to FIGS. 2-5. Upon being removed from a spent fuel pool and treated for dry storage, spent fuel canister 70 is positioned in transfer cask 80. Transfer cask is 80 is carried by cask crawler 90 to a desired underground VVO 20 for storage. While a cask crawler is illustrated, any suitable means of transporting transfer cask 80 to a position above underground VVO 20 can be used. For example, any suitable type of load-handling device, such as without limitation, a gantry crane, overhead crane, or other crane device can be used.

In preparing the desired underground VVO 20 to receive canister 70, lid 41 is removed from body 21 so that cavity 26 is open. Cask crawler 90 positions transfer cask 80 atop underground VVO 20. After transfer cask is properly secured to the top of underground VVO 20, a bottom plate of transfer cask 80 is removed. If necessary, a suitable mating device can be used to secure the connection of transfer cask 80 to underground VVO 20 and to remove the bottom plate of transfer cask 80 to an unobtrusive position. Such mating devices are well known in the art and are often used in canister transfer procedures. Canister 70 is then lowered by cask crawler 90 from transfer cask 80 into cavity 26 of underground VVO 20 until the bottom surface of canister 70 contacts and rests atop support blocks 32, as described above.

When resting on support blocks 32, a major portion of the canister's height is below grade. Most preferably, the entirety of canister 70 is below grade when in its storage position. Once canister 70 is positioned and resting in cavity 26, lid 41 is placed over cavity 26, substantially enclosing cavity 26. Lid 41 is oriented atop body 21 so that shear ring 47 protrudes into cavity 26 and outlet ventilation ducts 42 are azimuthally and circumferentially separated from inlet ventilation ducts 25 on body 21. Lid 41 is then secured to body 21 with bolts. As a result of the heat emanating from canister 70, cool air from the ambient is siphoned into inlet ventilation ducts 25 and into the bottom of cavity 26. This cool air is then warmed by the heat from the spent fuel in canister 70, rises in cavity 26 via annular space 60 (FIG. 6) around canister 70, and then exits cavity 26 as heated air via outlet ventilation ducts 42 in lid 41.

Figure 9:
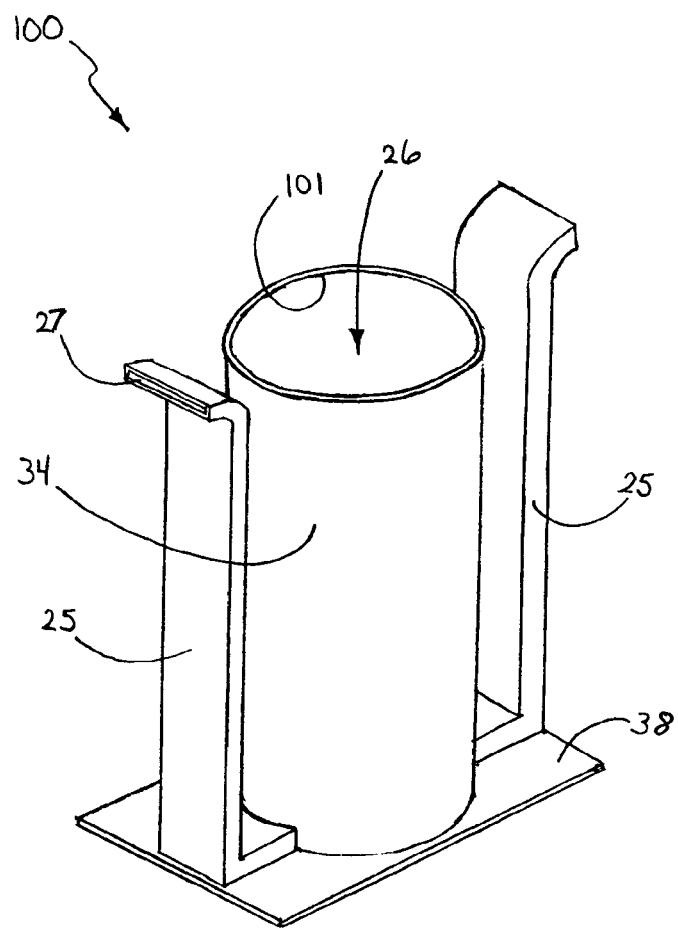
FIG. 9 is a top perspective view of an integral structure for storing spent nuclear fuel according to an embodiment of the present invention.

Referring now to FIG. 9, an integral structure 100 for storing spent nuclear fuel is illustrated according to an embodiment of the invention. Integral structure 100 is essentially a combination of shell 34, inlet ventilation ducts 25, and bottom plate 38 of underground VVO 20 without the concrete body. Integral shell 100 can be used to store canisters of spent nuclear fuel without the addition of the concrete body. Therefore, some embodiments of the present invention will be the integral structure 100 itself.

Shell 34, bottom plate 38, and inlet ventilation ducts 25 are preferably formed of a metal, such as low carbon steel. Other suitable materials include, without limitation, stainless steel, aluminum, aluminum-alloys, plastics, and the like.

Inlet ventilation ducts 25, bottom plate 38, and shell 34 are seal welded at all junctures to form a unitary structure that is hermetically sealed to the ingress water and other fluids. The only way water or other fluids can enter cavity 26 is through inlets 27 or top opening 101 of shell 34. The height of shell 34 is designed so that a canister of spent fuel can be positioned within cavity 26 so as not to protrude from top opening 101. There is no limitation on the height to which shell 34 can be constructed. The exact height of shell 34 will be dictated by the height of the spent fuel canister to be stored therein, the desired depth (below grade) at which the canister is to be stored, whether the outlet ventilation ducts are in the lid or integrated into the shell 34, and/or the desired height of the outlet air plenum that is to exist during canister storage.

FIGS. 10-13 illustrate a process of using integral structure 100 to store a spent fuel canister at a below grade position at an ISFSI, or other location, according to one embodiment of the present invention. It should be noted that the any of the design and/or structural details discussed above with respect to underground VVO 20 can be incorporated into integral structure 100, such as, for example, the use of vent screens, variable configurations of the inlet and outlet ducts, clearances, the use of an insulation, etc. However, in order to avoid redundancy, a discussion of these details will be omitted with the understanding that any or all of the details of underground VVO 20 are (or can be) incorporated into the storing methods and apparatus of integral structure 100, and vice versa.

Figure 10:
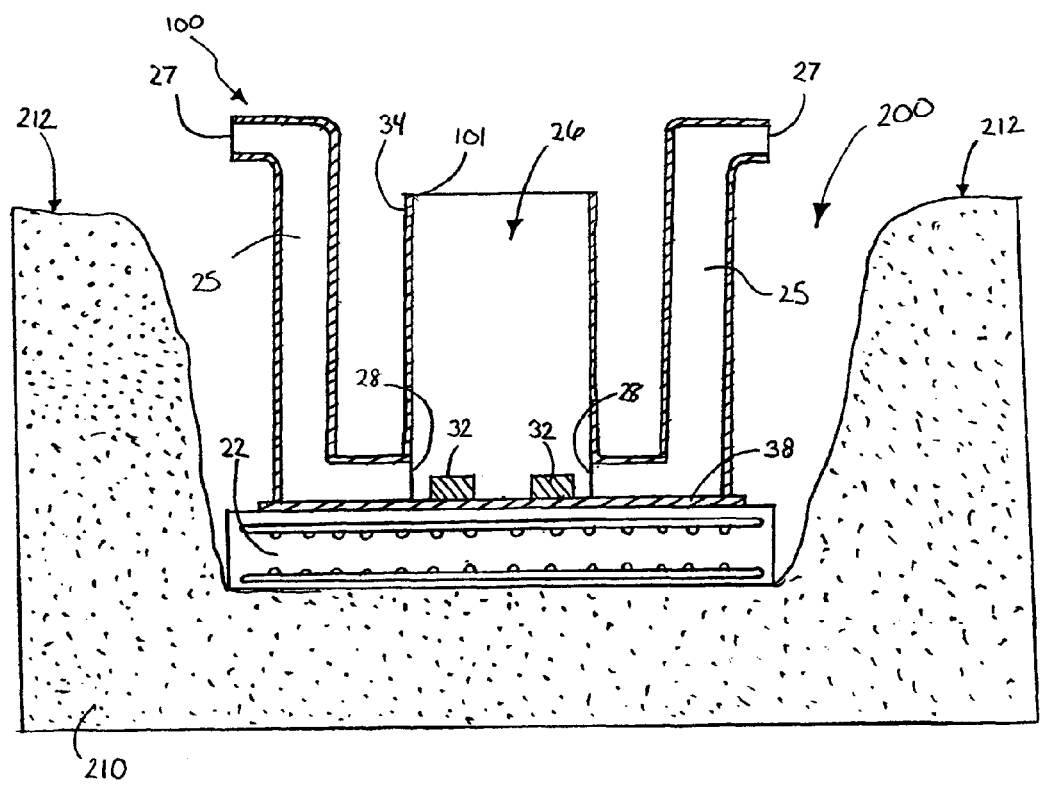
FIG. 10 is a schematic of the integral structure of FIG. 9 lowered into a below grade hole and positioned atop a base.

Referring to FIG. 10, a hole 200 is first dug into the ground 210 at a desired position within the ISFSI and at a desired depth. Once hole 200 is dug, and its bottom properly leveled, base 22 is placed at the bottom of hole 200. Base 22 is a reinforced concrete slab designed to satisfy the load combinations of recognized industry standards, such as ACI-349. However, in some embodiments, depending on the load to be supported and/or the ground characteristics, the use of a base may be unnecessary.

Once base 22 is properly positioned in hole 200, integral structure 100 is lowered into the hole 200 in a vertical orientation until it rests atop base 22. Bottom plate 38 of integral structure 100 contacts and rests atop the top surface of base 22. if desired, the bottom plate 38 can be bolted or otherwise secured to the base 22 at this point to prohibit future movement of the integral structure 100 with respect to the base 22.

Figure 11:
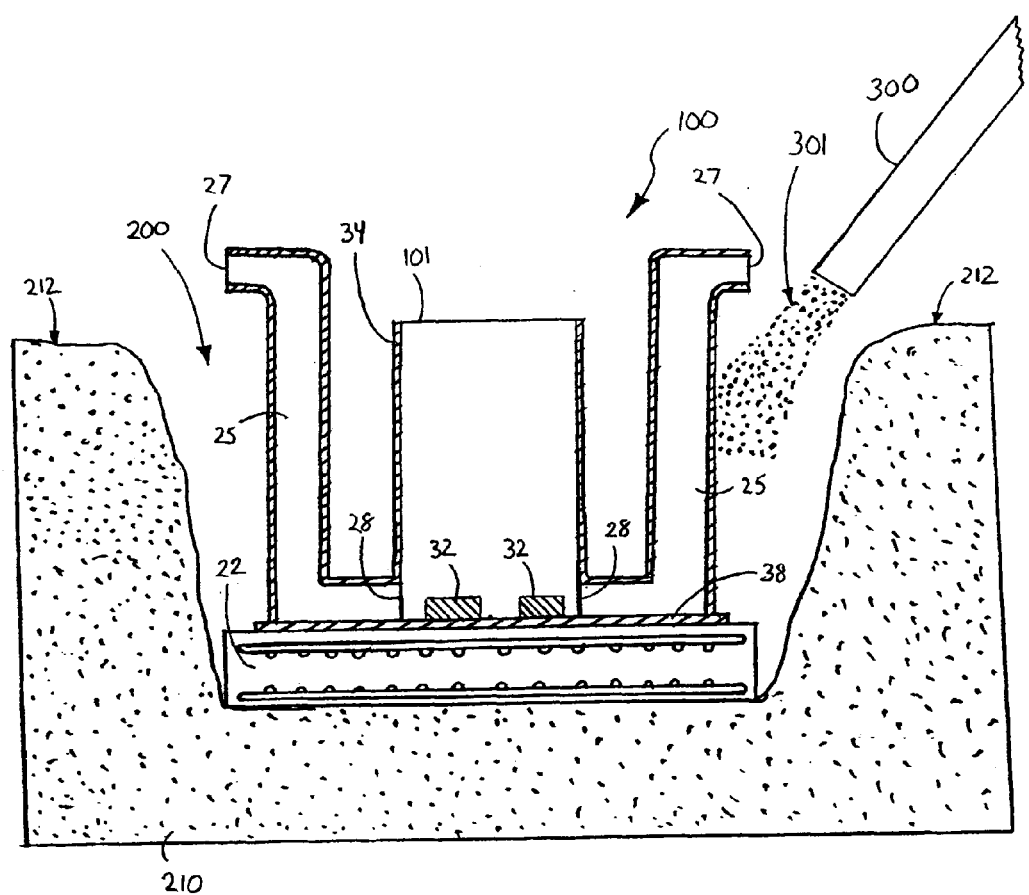
FIG. 11 is a schematic of the arrangement of FIG. 10 wherein the below grade hole is being filled with soil.

Referring to FIG. 11, once integral structure 100 is resting atop base 22 in the vertical orientation, soil supply pipe 300 is moved into position above hole 200. Soil 301 is delivered into hole 200 exterior of integral structure 100, thereby filling hole 200 with soil 301 and burying a portion of the integral structure 100. While soil 301 is exemplified to fill hole 200, any suitable engineered fill can be used that meets environmental and shielding requirements. Other suitable engineered tills include, without limitation, gravel, crushed rock, concrete, sand, and the like. Moreover, the desired engineered fill can be supplied to the hole by any means feasible, including manually, dumping, and the like.

Figure 12:
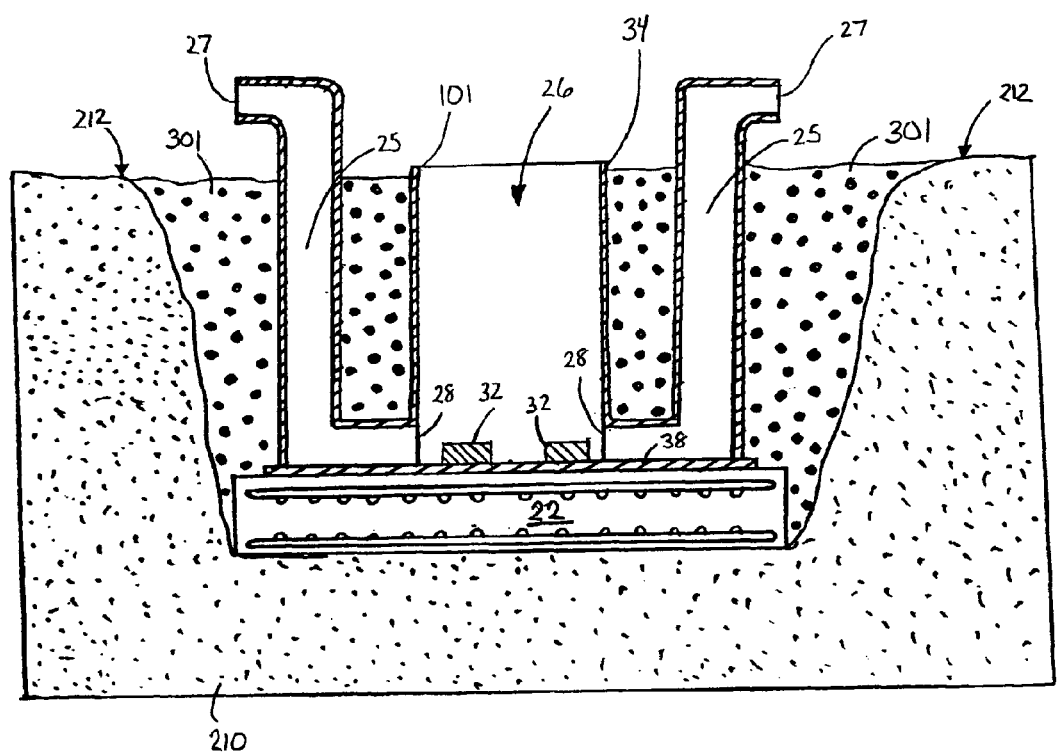
FIG. 12 is a schematic illustrating the arrangement of FIG. 10 wherein the below grade hole is completely filled with soil.

Referring to FIG. 12, soil 301 is supplied to hole 200 until soil 301 surrounds integral structure 100 and fills hole 200 to a level where soil 301 is approximately equal to ground level 212. Soil 301 is in direct contact with the exterior surfaces of integral structure 100 that are below grade. When hole 200 is filled with soil 301, inlets 27 of inlet ventilation ducts 25 are above grade. Shell 34 also protrudes from soil 301 so that opening 101 is slightly above grade. Therefore, because integral structure 100 is hermetically sealed at all junctures, below grade liquids and soil can not enter into cavity 26 or inlet ventilation ducts 25. Support blocks 32 are provided at the bottom of cavity 26 for supporting a stored spent fuel canister.

Figure 13:
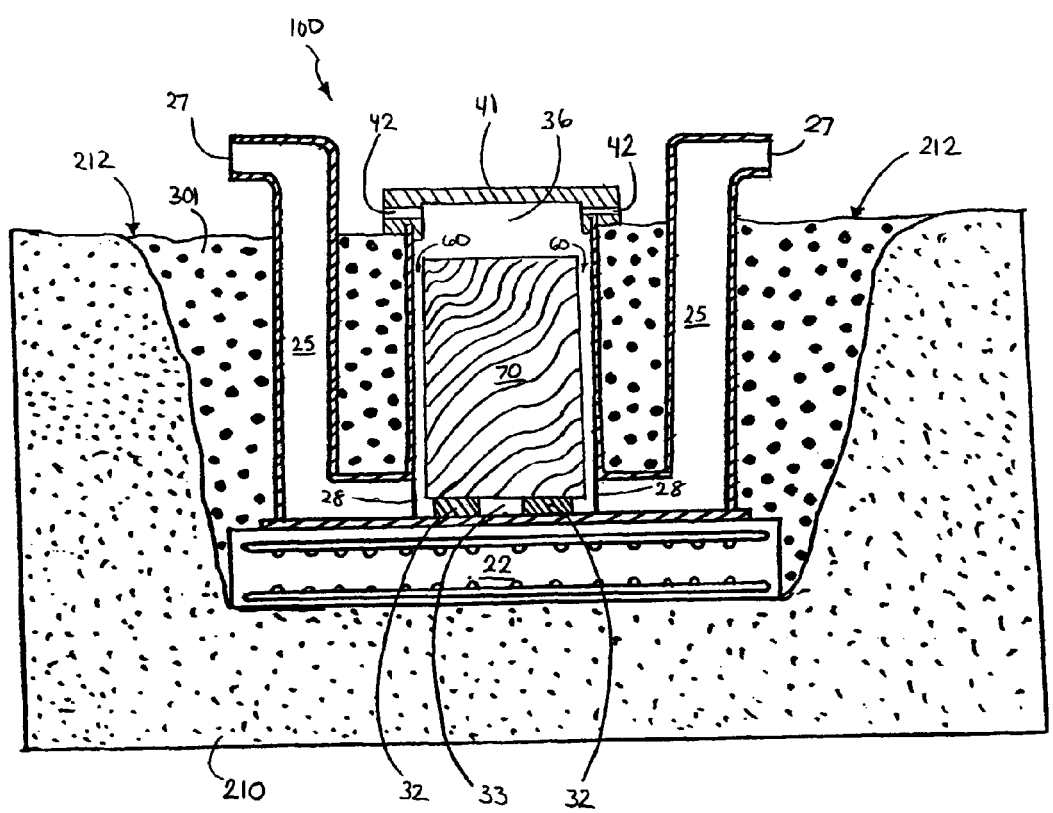
FIG. 13 is a schematic illustrating the arrangement of FIG. 12 wherein a spent fuel canister is loaded in the integral structure and a lid positioned thereon.

Referring to FIG. 13, once hole 200 is adequately filled with soil 301, a canister 70 of spent fuel 70 is loaded into cavity 26 of integral structure 100. The canister loading sequence is discussed in greater detail above with respect to FIG. 5. Canister 70 is lowered into cavity 26 until it rests on support blocks 32. As discussed above with respect to FIG. 6, support blocks 32 and outlets 28 of integral structure 100 are specially designed to deal with "smart flood" conditions. Canister 70 rests on support blocks 32, forming an inlet air plenum 33 between the bottom of canister 70 and the floor of cavity 26 (which in this case is bottom plate 38).

When canister 70 is supported on support blocks 32, the entire height of canister 70 is below ground level 212. This maximizes use of the ground's radiation shielding capabilities. The depth at which canister 70 is below ground level 212 can be varied by increasing or decreasing the depth of hole 200. Once canister 70 is supported in cavity 26, lid 41 is placed atop shell 34, thereby closing opening 101 and prohibiting radiation from escaping upwards from cavity 26. Outlet air plenum 36 is formed between the bottom surface of lid 41 and the top of canister 70.

Lid 41 comprises outlet ventilation ducts 42. Outlet ventilation ducts 42 form passageways from outlet air plenum 36, through lid 41, to the ambient air above ground level 212. Outlet ventilation ducts 42 do not have to be provided in lid 41, but can be formed as part of the integral structure 100 if desired. This will be discussed in greater detail below with respect to FIG. 14.

Referring still to FIG. 13, when integral structure 100 is used to store spent nuclear fuel canister 70, the radiation shielding effect of the sub-grade is utilized while adequately facilitating cooling of canister 70. The cooling of canister 70 is facilitated by cool air entering inlet ventilation ducts 25 via above grade inlets 27. The cool air travels through inlet ventilation ducts 25 until it enters cavity 26 at or near inlet air plenum 33 via below grade outlets 28. Once the cool air is within cavity 26 it is warmed by the heat emanating from canister 70. As the air is warmed, it travels upward along the outer surface of canister 70 via annular space 60 until the air enters outlet air plenum 36. As the air travels upward through annular space 60 it continues to remove heat from canister 70. The warmed air then exits cavity 26 via outlet ventilation ducts 42 and enters the ambient air. This natural convective cooling flow repeats continuously until the canister 70 is adequately cooled.

Figure 14:
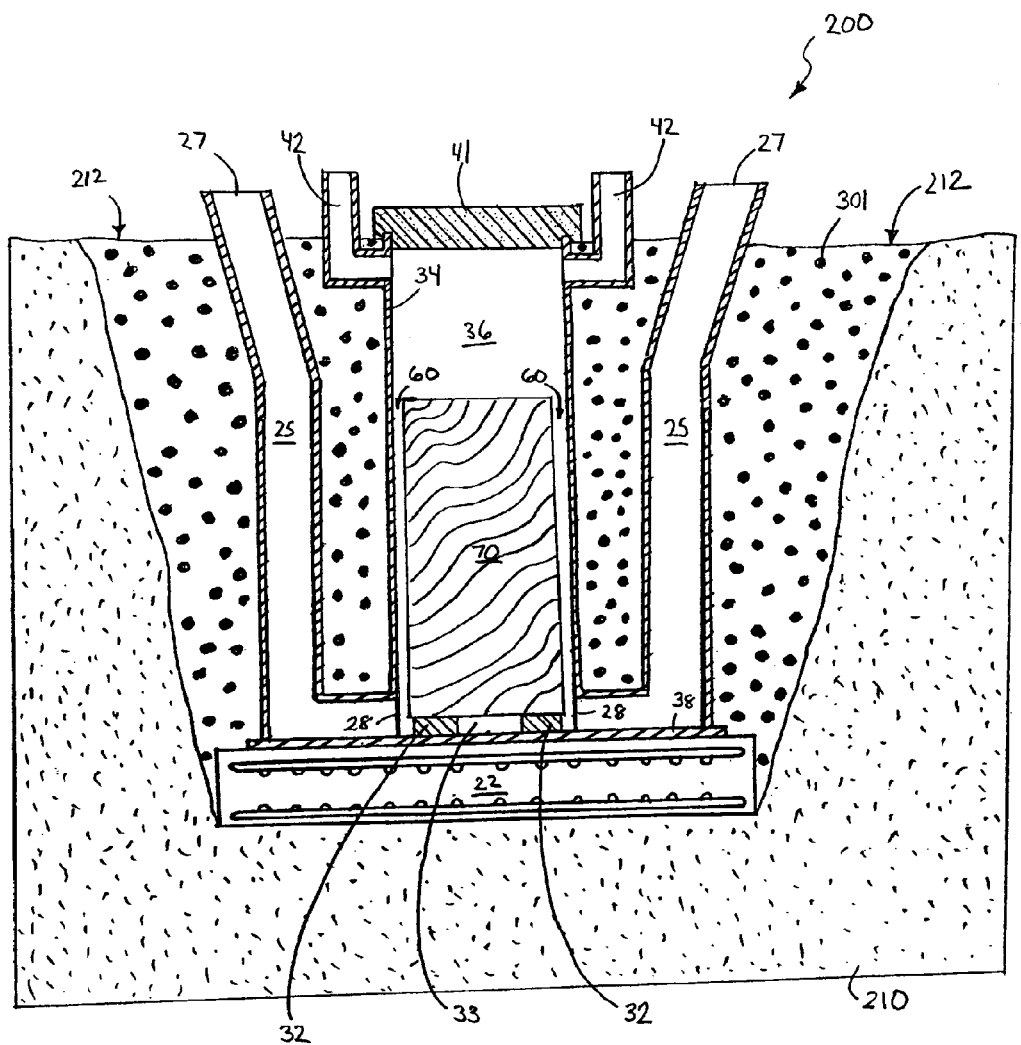
FIG. 14 is a schematic view of an integral structure according to an embodiment of the present invention having an alternative configuration for the inlet and outlet ventilation ducts.

Referring now to FIG. 14, an alternative embodiment of an integral structure 200 is illustrated. Integral structure 200 is used to store a spent fuel canister in manner similar to that of integral structure 100 discussed above. While much of the structure is identical to that of integral structure 100, integral structure 200 further comprises outlet ventilation ducts 42 seal welded directly to shell 34. The outlet ventilation ducts 42 can be formed out of any of the materials discussed above with respect to the inlet ventilation ducts 25. As a result of the outlet ventilation ducts 42 being part of integral structure 200, lid 41 can be free of such ducts. The cooling process of canister 70 remains the same.

Figure 15:
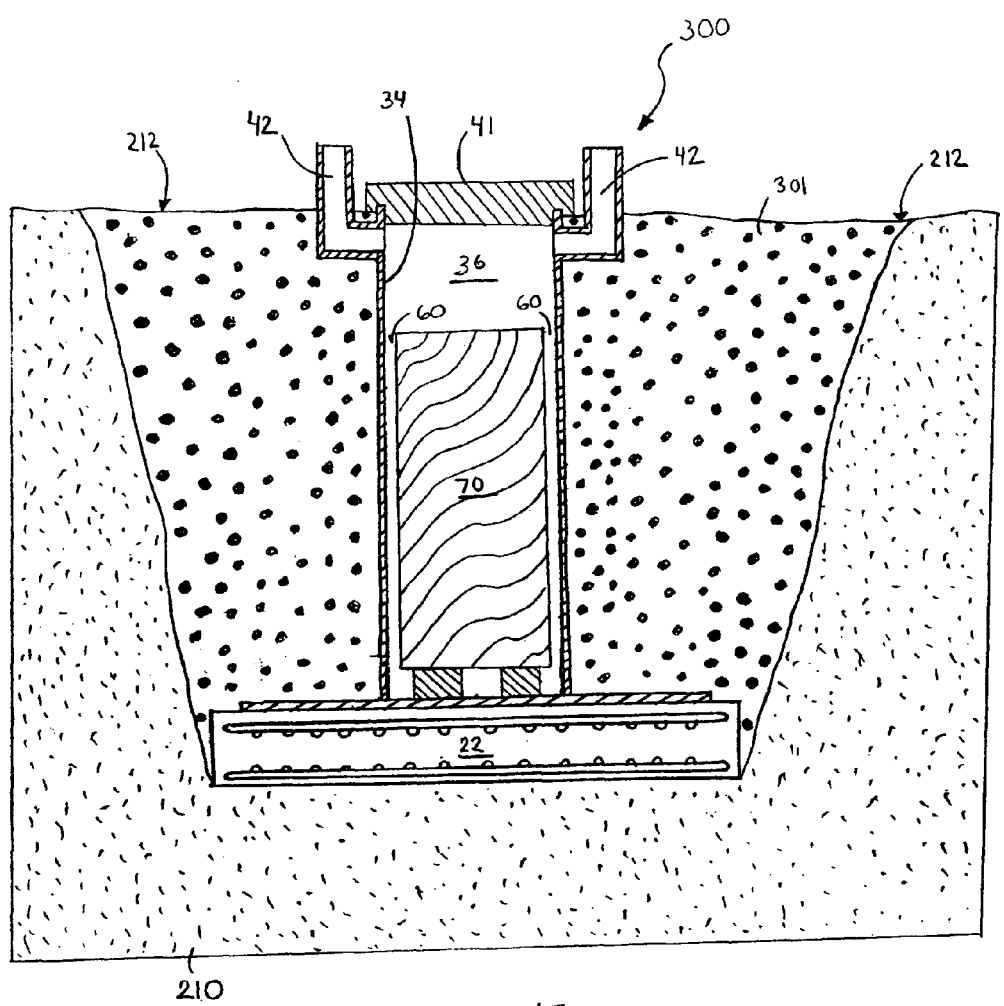
FIG. 15 is a schematic view of an integral structure for storing low heat spent fuel according to an embodiment of the present invention free of inlet ventilation ducts.

FIG. 15 illustrates an integral structure 300 according to another aspect of the present invention. Integral structure 300 is similar in many respect to that of integral structures 100 and 200 in its design and functioning. However, integral structure 300 is specifically designed to store canisters 70 holding low heat spent fuel. When a canister 70 is giving off low heat, for example in the magnitude of 2-3 kW, it is not necessary to supply inlet ventilation ducts to supply cool air to cavity 26. Therefore, the inlet ventilation ducts are omitted from integral structure 300. Integral structure 300 comprises only outlet ventilation ducts 42, which act as both an inlet for the cooler air and an outlet for the warmer air.

While outlet ventilation ducts 42 of integral structure 300 are seal welded to shell 34, it is possible for the outlet ventilation ducts to be located in the lid 41 if desired. Moreover, the concept of eliminating the inlet ventilation ducts for low heat load canister storage can be applied to any of the underground or above ground VVO embodiments illustrated in this application, specifically including underground VVO 20 and it derivatives.

While the invention has been described and illustrated in sufficient detail that those skilled in this art can readily make and use it, various alternatives, modifications, and improvements should become readily apparent without departing from the spirit and scope of the invention. Specifically, it is possible for the entire underground VVO and/or integral structure of the present invention to be below grade, so long as the inlet ventilation ducts and/or outlet ventilation ducts open to the ambient air above grade. This facilitates very deep storage of spent fuel canisters.

What is claimed is:

1. A method of storing radioactive materials, the method comprising:
    a) positioning a system comprising a shell forming a cavity and having an open top, and at least one inlet ventilation duct extending from an inlet to an outlet at a bottom portion of the cavity in a below grade hole so that the inlet of the inlet ventilation duct is above grade and the outlet of the inlet ventilation duct into the cavity is below grade;
    b) introducing engineered fill into the hole to circumferentially surround the shell;
    c) lowering a canister containing radioactive materials through the open top of the shell into the cavity; and
    d) subsequent to the canister being lowered into the cavity, placing a removable lid on the shell;
wherein the shell is formed of steel and the inlet ventilation duct is seal joined to the shell and a bottom plate attached to the shell to form a self-supporting unitary structure.

2. The method of claim 1 wherein the system further comprises at least one outlet ventilation duct forming, a passageway from a to portion of the cavity to an ambient atmosphere.

3. The method of claim 2 wherein the lid comprises at least one outlet ventilation duct forming, a passageway from a top portion of the cavity to an ambient atmosphere.

4. The method of claim 1 wherein the system further comprises a concrete body circumferentially surrounding the shell, the engineered fill circumferentially surrounding the concrete body.

5. The method of claim 1 wherein step c) further comprises supporting the canister in the cavity so that an inlet air plenum exists between a floor of the cavity and a bottom surface of the canister and an outlet air plenum exists between a bottom surface of the lid and a top surface of the canister.

6. The method of claim 1 wherein the cavity extends along a longitudinal axis and has a transverse cross-sectional area that can accommodate no more than one of the canister.

7. A method of storing radioactive materials, the method comprising:

a) providing a system comprising a structure having a metal shell forming a cavity and having an open top, the cavity having a top portion and a bottom portion, at least one inlet ventilation duct thrilling a passageway from an ambient air inlet to an outlet at the bottom portion of the cavity, and at least one outlet ventilation duct forming a passageway from the top portion of the cavity to ambient air;
b) lowering a canister loaded with radioactive materials through the open top of the structure into the cavity until a bottom surface of the canister is lower than a top of the outlet of the at least one inlet ventilation duct;
c) supporting the canister in the cavity in a position where the bottom surface of the canister is lower than the top of the outlet of the at least one inlet ventilation duct, wherein the inlet ventilation duct is shaped so that a line of sight does not, exist to the canister from the ambient air inlet through the at least one inlet ventilation duct; and
d) placing a removable lid atop of the structure;
wherein the inlet ventilation duct is seal joined to the shell and a bottom plate attached to the shell to form a self-supporting unitary structure.

8. The method of claim 7 wherein the lid comprises the at least one outlet ventilation duct.

9. The method of claim 7 wherein step a comprises positioning the system in a below grade hole so that at least a major portion of the structure and the cavity is located below grade, the outlet of the at least one inlet ventilation duct is located below grade, and the inlet of the at least one inlet ventilation duct is above grade.

10. The method of claim 7 wherein the structure is a metal shell and the system further comprises a concrete body surrounding the metal shell.

11. The method of claim 7 wherein the cavity extends along a longitudinal axis and has a transverse cross-sectional area that can accommodate no more than one of the canister.

12. The method of claim 7 wherein step c) further comprises supporting the canister in the cavity so that an inlet air plenum exists between a floor of the cavity and a bottom surface of the canister and an outlet air plenum exists between a bottom surface of the lid and a top surface of the canister.

* * * * *